US010698455B2

(12) United States Patent
Yoon et al.

(10) Patent No.: US 10,698,455 B2
(45) Date of Patent: Jun. 30, 2020

(54) ANTENNA MODULE AND ELECTRONIC DEVICE INCLUDING THE SAME

(71) Applicant: WITS Co., Ltd., Yongin-si, Gyeonggi-do (KR)

(72) Inventors: Hyo Jung Yoon, Suwon-si (KR); Ki Won Chang, Suwon-si (KR); Chang Mok Han, Suwon-si (KR); Si Hyung Kim, Suwon-si (KR); Tae Heon Lee, Suwon-si (KR); Hyung Wook Cho, Suwon-si (KR); Taek Woo Kim, Suwon-si (KR); Sun Hee Lee, Suwon-si (KR); Dae Kyu Lee, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/163,737

(22) Filed: Oct. 18, 2018

(65) Prior Publication Data
US 2019/0294217 A1   Sep. 26, 2019

(30) Foreign Application Priority Data

Mar. 23, 2018 (KR) .......... 10-2018-0033901
Jun. 8, 2018 (KR) .......... 10-2018-0066380

(51) Int. Cl.
*G06F 1/16* (2006.01)
*H01Q 1/38* (2006.01)
(Continued)

(52) U.S. Cl.
CPC .......... *G06F 1/1698* (2013.01); *H01Q 1/14* (2013.01); *H01Q 1/241* (2013.01); *H01Q 1/38* (2013.01)

(58) Field of Classification Search
CPC .. H01Q 7/00; H01Q 7/06; H01Q 1/38; H01Q 1/243; H01Q 1/2225; H01Q 1/2208;
(Continued)

(56) References Cited

U.S. PATENT DOCUMENTS

2014/0218262 A1* 8/2014 Tsubaki .......... H01Q 7/00
343/867
2017/0331173 A1* 11/2017 Ju .......... H01Q 1/38
(Continued)

FOREIGN PATENT DOCUMENTS

JP   2004-348497 A   12/2004
JP   2008-28642 A    2/2008
(Continued)

OTHER PUBLICATIONS

Korean Office Action dated Mar. 26, 2019 in corresponding Korean Patent Application No. 10-2018-0066380 (5 pages in English, 5 pages in Korean).

*Primary Examiner* — Dung Hong
(74) *Attorney, Agent, or Firm* — Harness, Dickey & Pierce, P.L.C.

(57) ABSTRACT

An antenna module includes an insulating substrate; a first antenna wiring including a first spiral wiring disposed on the insulating substrate and having a first portion disposed adjacent to an edge of the insulating substrate, and a second spiral wiring disposed on the insulating substrate and spaced apart from the first spiral wiring; and a magnetic part disposed on one surface of the insulating substrate and disposed to overlap a second portion of the first spiral wiring that is adjacent to the second spiral wiring without overlapping the first portion of the first spiral wiring.

22 Claims, 20 Drawing Sheets

(51) Int. Cl.
*H01Q 1/14* (2006.01)
*H01Q 1/24* (2006.01)

(58) Field of Classification Search
CPC ......... G06K 7/10336; G06K 19/07773; G06K 19/07783; H04M 1/026; H04M 2250/04
See application file for complete search history.

(56) References Cited

U.S. PATENT DOCUMENTS

| | | | |
|---|---|---|---|
| 2018/0102814 A1* | 4/2018 | Yasutake | H01Q 7/06 |
| 2018/0107913 A1* | 4/2018 | Shi | H01Q 7/00 |
| 2018/0198209 A1* | 7/2018 | Kang | H01Q 7/06 |
| 2018/0277954 A1* | 9/2018 | Lee | H01Q 7/00 |
| 2018/0287258 A1* | 10/2018 | Kim | G06K 7/10158 |
| 2019/0013568 A1* | 1/2019 | Won | H01Q 1/2208 |
| 2019/0027826 A1* | 1/2019 | Won | H04B 5/0081 |

FOREIGN PATENT DOCUMENTS

| | | | | |
|---|---|---|---|---|
| JP | 2013-146050 A | | 7/2013 | |
| JP | 2013146050 A | * | 7/2013 | ............... H01Q 7/06 |
| JP | 6052375 B2 | | 12/2016 | |

\* cited by examiner

ANTENNA MODULE AND ELECTRONIC DEVICE INCLUDING THE SAME

CROSS-REFERENCE TO RELATED APPLICATIONS

This application claims the benefit under 35 USC 119(a) of Korean Patent Application Nos. 10-2018-0033901 filed on Mar. 23, 2018 and 10-2018-0066380 filed on Jun. 8, 2018 in the Korean Intellectual Property Office, the entire disclosures of which are incorporated herein by reference for all purposes.

BACKGROUND

1. Field

The following description relates to an antenna module mounted in an electronic device and used for short-range communications.

2. Description of Related Art

As portable terminals such as smartphones become common and functions thereof are improved, a payment method using a short-range communications function of portable terminals has emerged. However, since a data transmission channel is not present between a POS terminal which is conventionally used and commonly installed in a store, or the like, and a smartphone, payments made using smartphones have many obstacles. In order to solve the problem of such obstacles, methods using a 2D barcode or near field communications (NFC) have been proposed.

In addition, a magnetic secure transmission (MST) method capable of performing the payment without adding a separate reading apparatus to the POS terminal has recently been proposed.

Thereby, both an NFC antenna and an MST antenna may be mounted on a single portable terminal, and accordingly, an antenna module capable of maintaining communications performance while significantly reducing interference with other components within the portable terminal is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes an insulating substrate; a first antenna wiring including a first spiral wiring disposed on the insulating substrate and having a first portion disposed adjacent to an edge of the insulating substrate, and a second spiral wiring disposed on the insulating substrate and spaced apart from the first spiral wiring; and a magnetic part disposed on one surface of the insulating substrate and disposed to overlap a second portion of the first spiral wiring that is adjacent to the second spiral wiring without overlapping the first portion of the first spiral wiring.

The first spiral wiring may include a first region disposed between a central region of the first spiral wiring and the second spiral wiring, a third region disposed on an opposite side of the central region of the first spiral wiring from the first region, and a second region disposed between the first region and the third region, and the magnetic part may be disposed to overlap an entirety of the first region of the first spiral wiring.

The second spiral wiring may include a first region disposed between a central region of the second spiral wiring and the first spiral wiring, a third region disposed on an opposite side of the central region of the second spiral wiring from the first region of the second spiral wiring, and a second region disposed between the first region of the second spiral wiring and the third region of the second spiral wiring, and the magnetic part may be disposed to overlap an entirety of the first region of the second spiral wiring.

The magnetic part may be disposed to overlap at least a portion of the central region of the first spiral wiring.

The magnetic part may be disposed to overlap at least a portion of the second region of the first spiral wiring.

The magnetic part may be disposed to overlap at least a portion of the second spiral wiring.

The magnetic part may be disposed to overlap at least a portion of the third region of the first spiral wiring.

The first spiral wiring and the second spiral wiring may be connected to each other in series and may be disposed in opposing spiral directions.

A second antenna wiring may be disposed on the insulating substrate to surround the second spiral wiring.

At least a portion of the second antenna wiring may be disposed in the central region of the first spiral wiring.

The second antenna wiring may include a divided wiring disposed on an innermost side of the second antenna wiring and disposed to cross a central region of the second antenna wiring.

The divided wiring may include a modified pattern protruding from a central portion of the divided wiring to one side of the divided wiring.

An auxiliary wiring electrically may be connected to the first spiral wiring and disposed on the one surface of the insulating substrate to not overlap the magnetic part.

The auxiliary wiring may include linear wirings, and both ends of each linear wiring may be connected to the first spiral wiring through connection conductors penetrating through the insulating substrate.

A line width of the first portion of the first spiral wiring connected to the auxiliary wiring in parallel may be narrower than a line width of the second portion of the first spiral wiring.

An entire line width of the first portion of the first spiral wiring may be narrower than an entire line width of the second portion of the first spiral wiring.

One or both of the first spiral wiring and the second spiral wiring may be disposed on both of opposite surfaces of the insulating substrate and may have a partial parallel structure.

The first antenna wiring may include a leading wiring that leads wiring disposed on an inner side of the first spiral wiring or the second spiral wiring to an outer side of the first spiral wiring or the second spiral wiring, and the leading wiring may not overlap the magnetic part and may be exposed to an outside of the magnetic part.

An auxiliary member may be disposed on the one surface of the insulating substrate to not overlap the magnetic part.

The auxiliary member may have a thickness that is the same as or similar to a thickness of the magnetic part.

The auxiliary member may include a non-metallic material having high thermal conductivity.

The auxiliary member may include a non-metallic material having elasticity.

One surface of the auxiliary member may be bonded to the one surface of the insulating substrate.

An auxiliary wiring may be disposed on the one surface of the insulating substrate to not overlap the magnetic part. The auxiliary wiring may be thinner than the first antenna wiring, and the auxiliary member may be disposed to overlap the auxiliary wiring.

The first antenna wiring may disposed on both of opposite surfaces of the insulating substrate, and the auxiliary member may be stacked on the first antenna wiring.

An electronic device may include the antenna module of claim 1. A case may accommodate the antenna module. A circuit module may be accommodated in the case and may be disposed on one side of the antenna module. The antenna module may be disposed in the case so that the first portion of the first spiral wiring is adjacent to the circuit module or partially overlaps the circuit module.

In another general aspect, an apparatus includes an antenna module. The antenna module includes an insulating substrate, a magnetic part disposed on a first surface of the insulting substrate, and antenna wiring disposed on a second surface of the insulating substrate that is opposite to the first surface and including a first portion that overlaps with the magnetic part and a second portion that does not overlap with the magnetic part.

A part of the second portion may be disposed between the magnetic part and an edge of the insulating substrate.

A circuit module may be included and the part of the second portion may be disposed adjacent to the circuit module.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
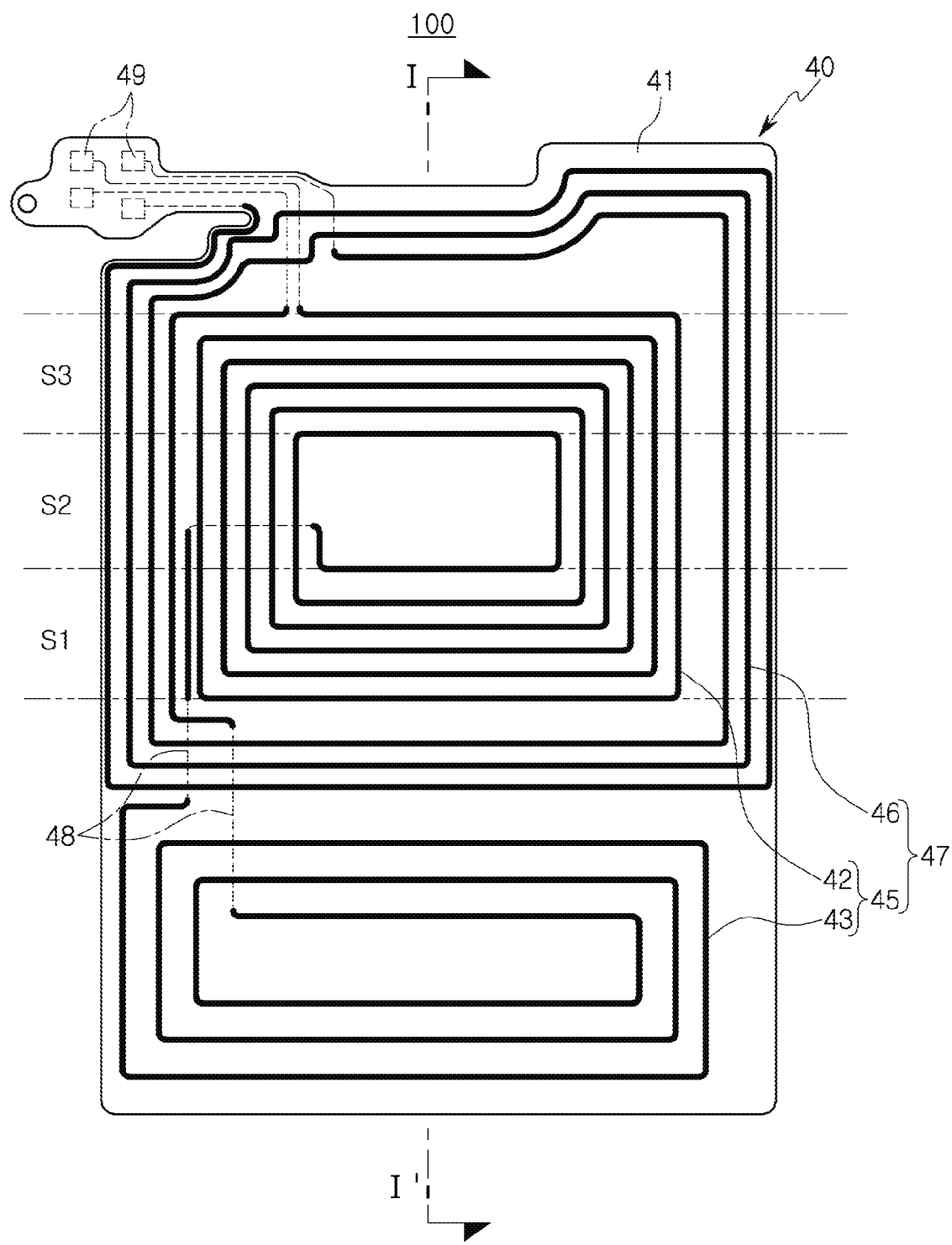
FIG. 1 is a plan view schematically illustrating an antenna module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
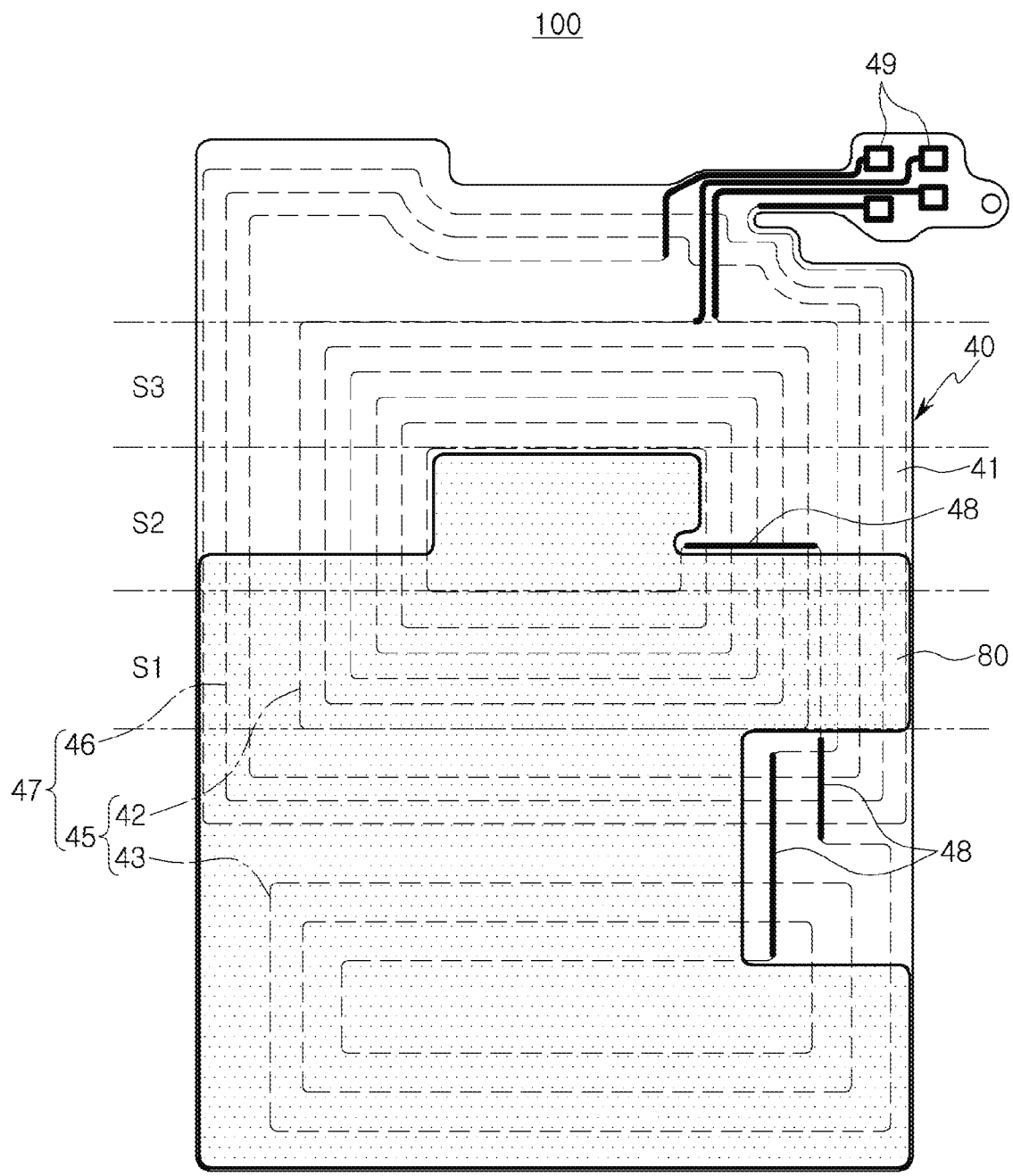
FIG. 2 is a view illustrating a rear surface of the antenna module illustrated in FIG. 1.
Figure 3:
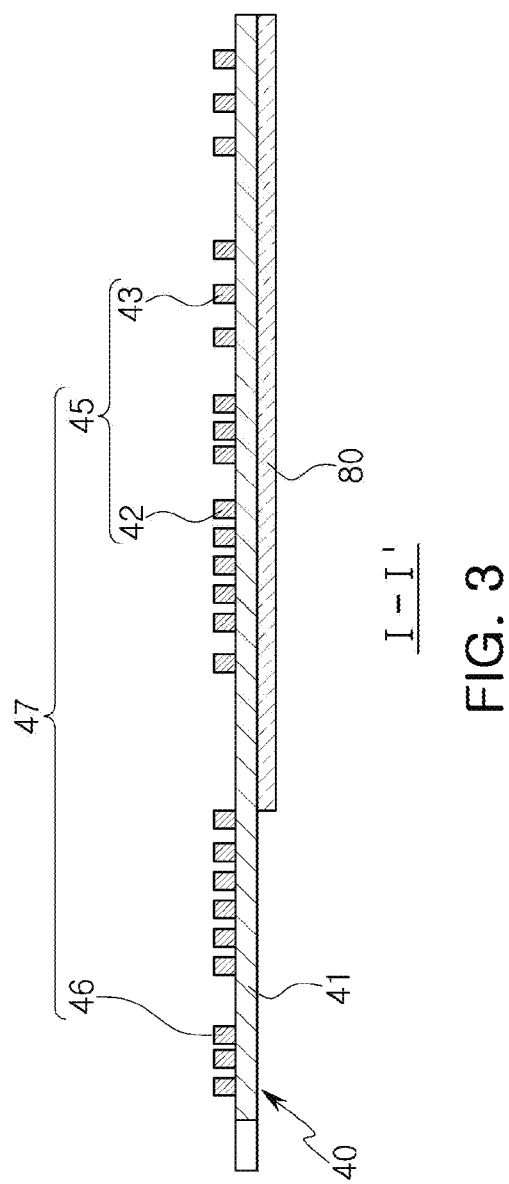
FIG. 3 is a cross-sectional view taken along a line I-I' of FIG. 1.

FIG. 1 is a plan view schematically illustrating an antenna module according to an example, FIG. 2 is a view illustrating a rear surface of the antenna module illustrated in FIG. 1, and FIG. 3 is a cross-sectional view taken along a line I-I' of FIG. 1.

Referring to FIGS. 1 through 3, an antenna module 100, which is an antenna module mounted in an electronic device and used for one or a plurality of short-range communications, may include a wiring part 40 and a magnetic part 80.

The wiring part 40 may include an insulating substrate 41 and at least one antenna wiring 47 formed on the insulating substrate 41.

The insulating substrate 41 may be a substrate on which a circuit wiring may be formed on one surface or opposite surfaces thereof, and for example, an insulating film (e.g., a polyimide film) may be used. The wiring part 40 may have a form of a flexible printed circuit board (PCB). However, the insulating substrate 41 is not limited to such a configuration, but various types of substrates (e.g., a printed circuit board, a ceramic substrate, a glass substrate, an epoxy substrate, a flexible substrate, and the like) which are well known in the art may be selectively used as long as the circuit wiring may be formed on one or both surfaces thereof.

The antenna wiring 47 may be formed on one surface or the opposite surface of the insulating substrate 41 and may have a form of the circuit wiring formed of a copper foil or the like.

For example, the antenna wiring 47 may be manufactured by patterning double sided copper clad laminates (CCL). The antenna wiring 47 may be formed by performing a photolithography method for the opposing surfaces of a flexible insulating substrate such as a film, and the wiring part 40 may be manufactured, for example in a form of the flexible PCB (FPCB) having a double sided structure.

The wiring part 40 may be very thin. However, the wiring part 40 may be manufactured in a multilayer substrate, or may also be manufactured in a form of the printed circuit board (PCB) having rigidity.

The antenna wiring 47 is not embedded in the insulating substrate 41, but may be disposed to externally protrude from the insulating substrate 41, as illustrated in FIG. 3. A distance at which the antenna wiring 47 protrudes from the insulating substrate 41 may be significantly reduced compared to the thickness of the magnetic part 80 or may be formed to be similar to or the same as the thickness of the magnetic part 80. However, the protruding distance of the antenna wiring 47 is not limited to such a configuration.

In the drawings, the antenna wiring 47 is formed of a single line coil, but is not limited to a single line coil, and may also be formed of a coil of a Litz wire formed of several strands.

The antenna wiring 47 may include a first antenna wiring 45 and a second antenna wiring 46.

Most of the first antenna wiring 45 may be disposed on a first surface of the insulating substrate 41 and only an overlapping portion of the wiring may be disposed on a second surface of the insulating substrate 41. The wiring disposed on the first surface and the wiring disposed on the second surface may be connected to each other through a connection conductor (not shown), such as a conductive via.

The overlapping portion of the wiring is an area in which a leading wiring 48 for drawing the wiring disposed on the inner side (e.g., the center side) of a spiral wiring having a spiral shape of the antenna wiring 47 to the outside of the spiral wiring is disposed.

The first antenna wiring 45 may include a first spiral wiring 42 and a second spiral wiring 43. Each of the first spiral wiring 42 and the second spiral wiring 43 may have a spiral shape and may be continuously formed (connected in series) by a wiring of one strand.

A spiral direction of the first spiral wiring 42 and a spiral direction of the second spiral wiring 43 may be opposite to each other. However, the spiral direction of the first spiral wiring 42 and the spiral direction of the second spiral wiring 43 are not limited to such a configuration.

Each of the first spiral wiring 42 and the second spiral wiring 43 may include a region (hereinafter, referred to as a central region) in which the wiring is not formed at the center. The central region refers to an inner region of one turn (hereinafter referred to as the innermost turn) disposed at the very center of the first spiral wiring 42 and the second spiral wiring 43. Therefore, a shape of the central region may be defined according to a shape of the innermost side.

The first antenna wiring 45 may be used as a magnetic secure transmission (MST) antenna.

The second antenna wiring 46 may be disposed to surround the first spiral wiring 42. Therefore, the first spiral wiring 42 may be disposed on the central region of the second antenna wiring 46 and the second spiral wiring 43 may be disposed outside of the second antenna wiring 46.

Most of the second antenna wiring 46 may be disposed on the first surface of the insulating substrate 41 and only an overlapping portion of the wiring may be disposed on the second surface of the insulating substrate 41. The wiring disposed on the first surface and the wiring on the second surface may be connected to each other through a connection conductor (not shown) disposed in the insulating substrate 41.

The second antenna wiring 46 is not limited to the above-mentioned configuration, but may be configured in various forms. For example, although the example describes a case in which only the first spiral wiring 42 is disposed on the central region of the second antenna wiring 46, various configurations are possible. For example, the second spiral wiring 43 may also be disposed on the central region of the second antenna wiring 46 or only the second spiral wiring 43 may be disposed on the central region of the second antenna wiring 46.

The second antenna wiring 46 configured as described above may be used as a near field communication (NFC) antenna.

The wiring part 40 may include a plurality of connection terminals 49 for electrical connection with the outside. The connection terminals 49 may be disposed to be exposed to the outside of the magnetic part 80.

Each of the connection terminals 49 may be connected to end portions of the first antenna wiring 45 and the second antenna wiring 46. Therefore, the wiring part 40 may include four connection terminals 49.

However, the number of the connection terminals 49 is not limited to four, but may be increased when the antenna wiring is added to the wiring part 40 for wireless charging or other short-range communications.

The magnetic part 80 may be used as a magnetic path of a magnetic field generated by the antenna wiring 47 of the wiring part 40 and may be provided to efficiently form the magnetic path of the magnetic field. The magnetic part 80 may be formed of a material capable of easily forming the magnetic path, and for example, a material having permeability such as a ferrite, a nanocrystal, an amorphous, a silicon steel plate, or the like may be used.

The magnetic part 80 may be formed in a thin plate shape like a sheet and may be disposed on only any one of opposite surfaces of the wiring part 40.

According to the example, the magnetic part 80 may be disposed on a second surface of the wiring part 40 (e.g., the second surface of the insulating substrate 41). The magnetic part 80 may be disposed on a portion of the second surface of the insulating substrate 41 on which the antenna wiring 47 is not formed. The magnetic part 80 may be in direct contact with the insulating substrate 41 and be coupled to the wiring part 40, thereby significantly reducing a thickness of the antenna module 100. However, a configuration of the disclosure is not limited to such a configuration, and the magnetic part 80 and the antenna wiring 47 may also overlap each other.

The magnetic part 80 may be disposed to face the antenna wiring 47 while having the insulating substrate 41 interposed therebetween.

The antenna wiring 47 and the magnetic part 80 being disposed to be opposite to each other or disposed to face each other means that the antenna wiring 47 and the magnetic part 80 are disposed to overlap each other when the antenna wiring 47 is projected to the magnetic part 80 in a state in which the wiring part 40 and the magnetic part 80 are coupled to each other.

The configuration in which the antenna wiring 47 and the magnetic part 80 are disposed to be opposite to each other or disposed to face each other is not limited to a case in which the antenna wiring 47 and the magnetic part 80 are disposed to be in contact with each other when the wiring part 40 and the magnetic part 80 are coupled to each other, and may include a case in which the antenna wiring 47 and the magnetic part 80 are disposed in a region facing each other.

For example, even though the antenna wiring 47 is disposed only on the first surface of the insulating substrate 41 and the magnetic part 80 is disposed on the second surface of the insulating substrate 41, an existence of a region overlapping the magnetic part 80 when the antenna wiring 47 is projected to a plane on which the magnetic part 80 is disposed means that the antenna wiring 47 and the magnetic part 80 are disposed to face each other or are disposed to be opposite to each other in the overlapping region.

The antenna wiring 47 being exposed to the outside of the magnetic part 80 means that when the antenna wiring 47 is projected to the magnetic part 80 as described above, the antenna wiring 47 does not overlap the magnetic part 80 and is disposed outside of the magnetic part 80. Therefore, a portion of the antenna wiring 47 disposed outside of the magnetic part 80 means a portion of the antenna wiring 47 that does not face the magnetic part 80.

According to the example, the magnetic part 80 may be coupled to the wiring part 40 so as to partially face the first antenna wiring 45 without facing the entirety of the first antenna wiring 45.

The first spiral wiring 42 is divided into three regions in relation to a distance from the second spiral wiring 43, as illustrated in FIGS. 1 and 2.

According to the example, among the first spiral wiring 42, (in relation to distance from the second spiral wiring 43), the wiring disposed at a distance away from the central region of the first spiral wiring 42 may be defined as a third region S3, and the wiring disposed to be close to the central region of the first spiral wiring 42 may be defined as a first region S1. The wiring between the first region S1 and the third region S3, that is, including the central region of the first spiral wiring 42 and disposed at the same distance as the central region may be defined as a second region S2.

According to the example, the magnetic part 80 may be disposed to face the entirety of the first region S1 and a portion of the second region S2 of the first spiral wiring 42. In the second region S2, the magnetic part 80 may be disposed to face a portion of the wiring disposed on the second region S2 and the entirety of the central region. However, the magnetic part 80 may be disposed so as not to face the third region S3 of the first spiral wiring 42.

The first spiral wiring 42 may be configured so that a portion disposed to be adjacent to an upper end portion of the wiring part 40 in relation to the central region is exposed to the outside of the magnetic part 80 and a portion disposed to adjacent to the second spiral wiring 43 in relation to the central region faces the magnetic part 80.

Referring to FIG. 2, the magnetic part 80 according to the example may be configured so as not to overlap the leading wiring 48. As a result, the magnetic part 80 may be disposed so as not to fully cover the entirety of the central region of the first spiral wiring 42. However, according to the example, such a configuration may also be considered as the magnetic part 80 being disposed to face the entirety of the central region. Therefore, if the magnetic part 80 is disposed to face an area of 80% or more of the central region, it may be understood that the magnetic part 80 faces the entirety of the central region. This may be applied to all examples.

The second spiral wiring 43 may entirely face the magnetic part 80. However, since the leading wiring 48 is disposed on the second surface of the insulating substrate 41, a thickness of the antenna module 100 may be increased when the magnetic part 80 overlaps the leading wiring 48. Therefore, in order to prevent an increase in the thickness of the antenna module 100, the magnetic part 80 may be partially removed from a region in which the leading wiring 48 is formed.

If the magnetic part 80 is disposed to face an area of 80% or more of an entire area of the spiral wirings, it may be understood that the magnetic part 80 faces the entirety of the spiral wirings.

The antenna module 100 according to the example may be exposed to the outside of the magnetic part 80, while a portion (e.g., the third region S3) of the first spiral wiring 42 disposed at an outer side of the wiring part 40 does not face the magnetic part 80.

Conventionally, the magnetic part is disposed to face the entirety of the wiring, but in this case, since most of the magnetic flux flows through the magnetic part, it is difficult to extend a range of the magnetic field.

However, as in the example disclosed herein, in a case in which the portion of the first spiral wiring 42 is exposed, most of the magnetic field generated from the exposed portion may be radiated into the atmosphere. Therefore, since a range of the magnetic field radiated from an outer portion of the antenna module 100 may be extended, a recognition rate may be increased as compared to a conventional antenna module in which the magnetic part covers the entirety of the antenna wiring.

Since the magnetic part 80 is disposed on only one side of the wiring part 40, not on both sides of the wiring part 40, the thickness of the antenna module may be significantly reduced as compared to the conventional antenna module in which the magnetic parts 80 are disposed on both sides of the wiring part 40.

Figure 16A:
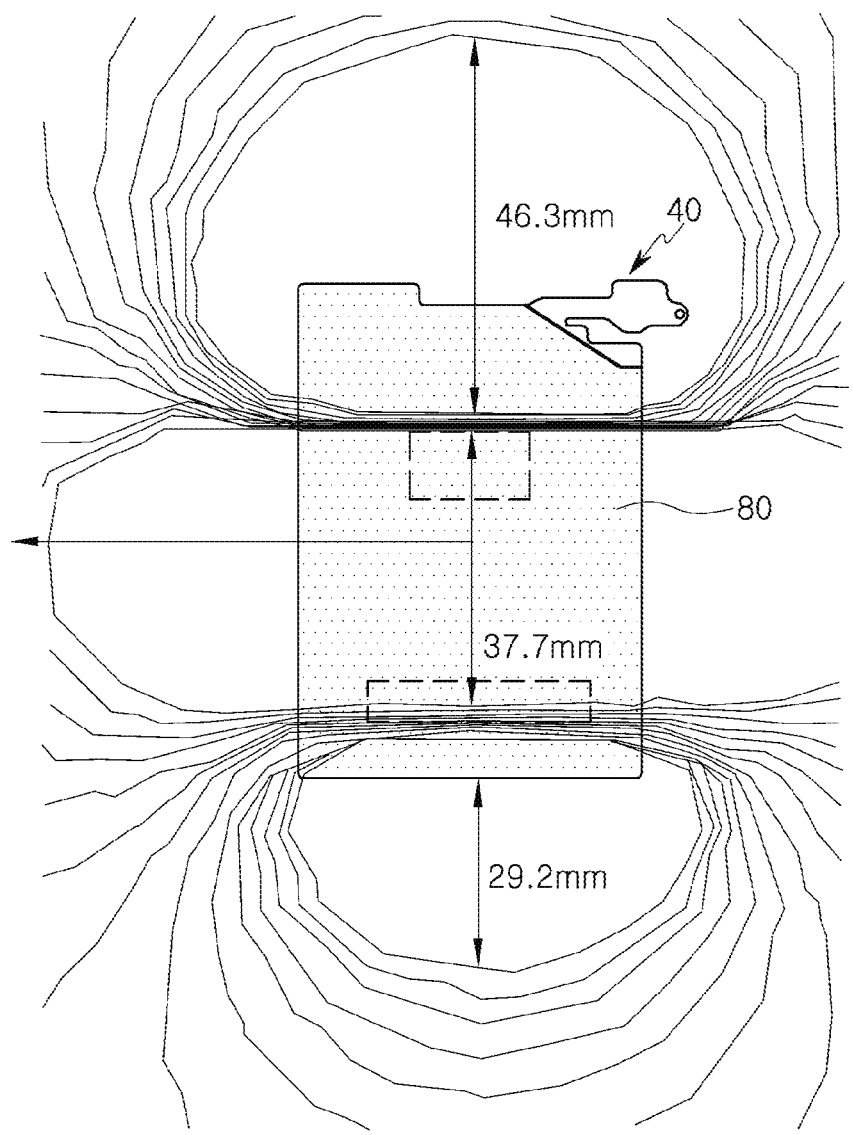
FIGS. 16A and 16B are views for describing efficiency of an antenna module according to an example.
Figure 16B:
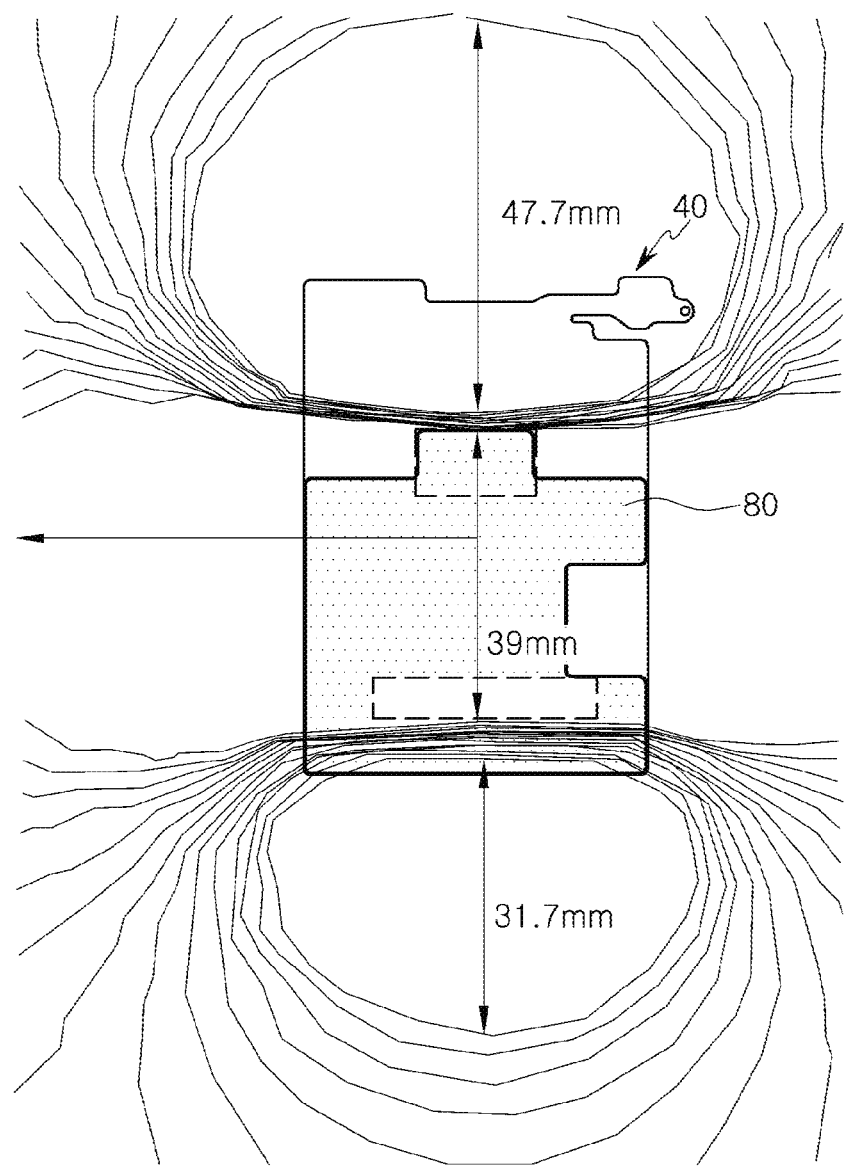

FIGS. 16A and 16B are views for describing efficiency of the antenna module according to the examples and are views illustrating simulation results of a recognition rate of MST communications using the first antenna wiring 45 around the antenna module.

FIG. 16A is a view illustrating a recognition rate of a case in which the antenna module is configured so that the magnetic part 80 faces an entire region of the wiring part 40 and FIG. 16B illustrates a recognition rate of the antenna module illustrated in FIGS. 1 and 2.

In FIGS. 16A and 16B, a region in which a contour line is illustrated is a region in which the recognition rate is low and short-range communications are not substantially performed. In addition, an empty region in which the contour line is not illustrated is a region in which the recognition rate is high and the short-range communications are substantially possible.

Comparing FIGS. 16A and 16B, a recognizable region of the antenna module illustrated in FIG. 16B is wider than that of FIG. 16A. Therefore, as the first region (S1 of FIG. 1) of the antenna module is exposed to the outside of the magnetic part 80, it may be seen that an MST recognition rate of the antenna module is increased in the corresponding region.

In the case in which the magnetic part 80 is disposed to partially face the first spiral wiring 42, a high recognition rate may be provided and a size of the magnetic part 80 may also be significantly reduced. The manufacturing cost may also be reduced.

Figure 4:
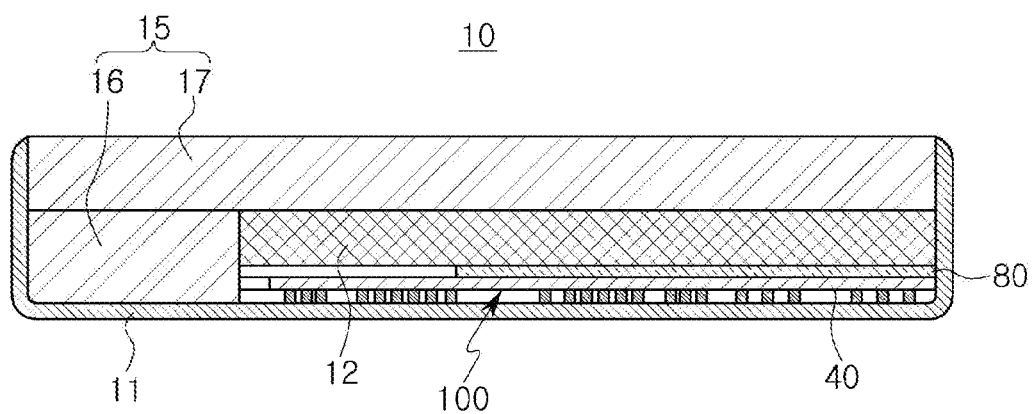
FIG. 4 is a cross-sectional view schematically illustrating an electronic device according to an example.

FIG. 4 is a cross-sectional view schematically illustrating an electronic device according to an example.

Referring to FIG. 4, an electronic device 10 according to an example, which is a portable terminal including the antenna module 100 (FIG. 1) described above, may perform short-range communications through the antenna module 100.

The electronic device 10 may include a terminal body 15, a cover 11, a battery 12, and the antenna module 100.

The terminal body 15 may include a circuit module 16 in which a display 17, a camera, and the like are mounted.

The cover 11, which is a rear cover coupled to the terminal body 15 to complete the portable terminal, may be a battery cover separated from the terminal body 15 when the battery is replaced. However, the cover 11 is not limited thereto, but may also include an integral cover which is difficult to separate from the terminal body 15.

The battery 12 may be disposed between the terminal body 15 and the cover 11. The battery 12 may be a chargeable and dischargeable secondary battery and may be attached to and detached from the portable terminal, but is not limited to such a configuration.

The antenna module 100 may be disposed between the battery 12 and the cover 11 and may perform wireless communications with a wireless communications device disposed outside of the portable terminal.

The antenna module 100 may have the magnetic part 80 disposed between the wiring part 40 and the battery 12. The third region S3 (FIG. 1) in the wiring part 40 that does not face the magnetic part 80, that is, the portion of the first spiral wiring 42 exposed to the outside of the magnetic part 80 may be disposed to partially overlap the circuit module 16, or may be disposed to be adjacent to the circuit module 16. Therefore, the magnetic field generated from the region that does not face the magnetic part 80 may be extended to the circuit module 16 side.

A surface of the battery 12 may be formed of a metal material. Therefore, in order to significantly reduce interference with the magnetic field generated from the antenna module 100, the magnetic part 80 may be interposed between the wiring part 40 and the battery 12. However, since the circuit module 16 contains a relatively small amount of metal as compared to the battery 12, the magnetic field may be easily extended in the circuit module 16 as compared to in the battery 12.

The electronic device 10 according to the example may increase the recognition rate of the antenna module 100 by maximally extending the magnetic field toward the circuit module 16.

Meanwhile, the disclosure is not limited to such a configuration. For example, if a component capable of easily spreading the magnetic field as compared to the battery is present in the electronic device, in addition to the circuit module 16, the antenna module 100 may be disposed so that the third region S3 that does not face the magnetic part 80 overlaps the component or is adjacent to the component.

In the example, a mobile phone (or a smartphone) is described as an example of the electronic device. However, the electronic device is not limited to such a mobile phone or smartphone, but may include any electronic device which may be carried and perform wireless communications, such as a notebook, a tablet PC, a wearable device, and the like.

The antenna module according to the disclosure is not limited to the above-mentioned examples, but may be variously modified.

Figure 5:
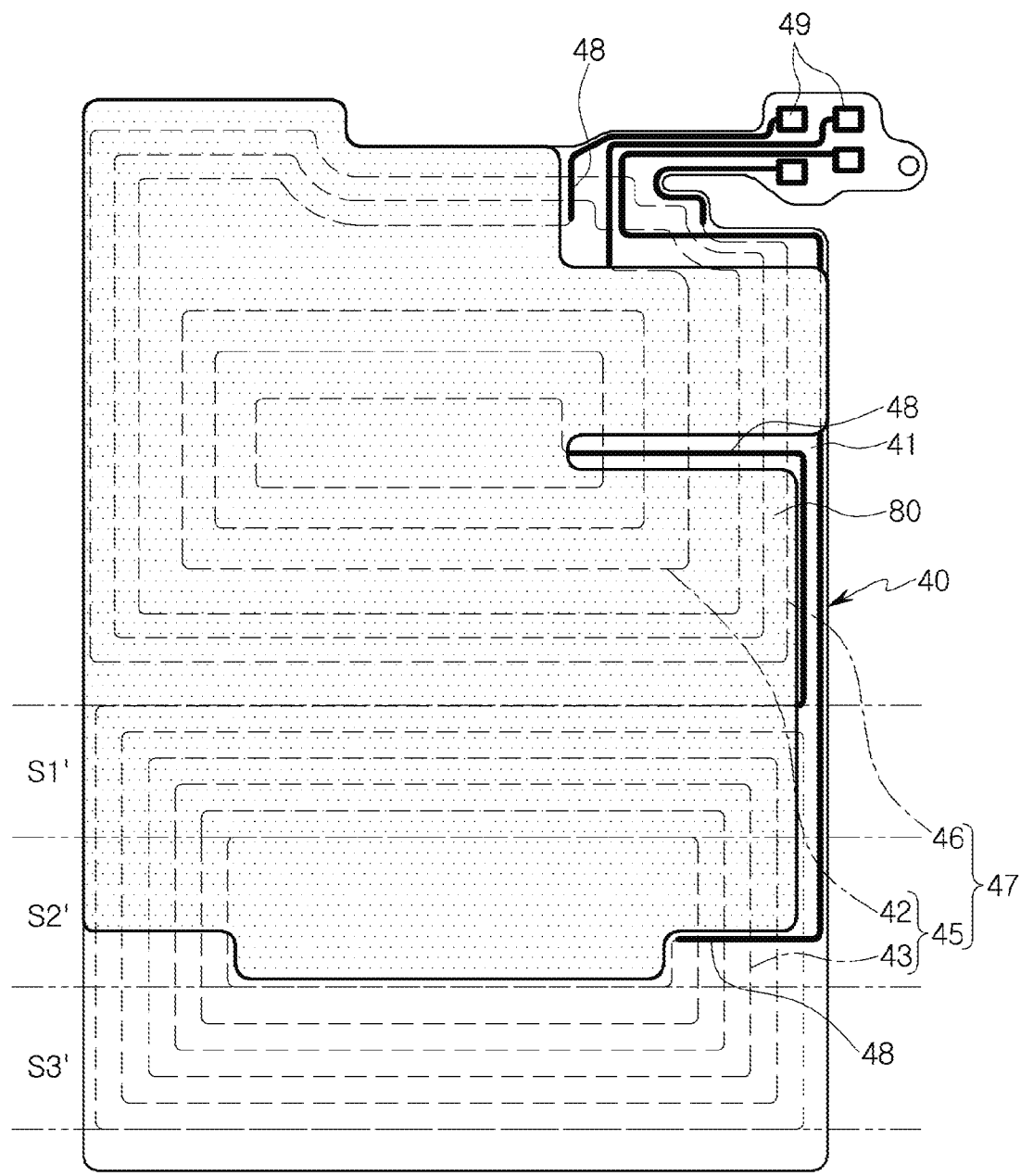
FIG. 5 is a plan view schematically illustrating an antenna module according to an example.

FIG. 5 is a plan view schematically illustrating an antenna module according to an example.

Referring to FIG. 5, an antenna module according to the example may have the magnetic part 80 that faces a portion of the second spiral wiring 43.

The second spiral wiring 43 may be divided into a first region S1', a second region S2', and a third region S3' according to a reference (the distance between the central regions of the first spiral wiring 42 and the second spiral wiring 43), and the magnetic part 80 may also be disposed to face a portion of the second spiral wiring 43. That is, the magnetic part 80 may be disposed to face the entirety of the first region S1', and a portion of the wiring of the second region S2' and the entirety of the central region.

The magnetic part 80 faces the entirety of the first spiral wiring 42, and the entirety of the second antenna wiring 46 is disposed to surround the first spiral wiring 42.

In the example, the entirety of the first spiral wiring 42 or the second antenna wiring 46 faces the magnetic part 80, but in the case in which the leading wiring 48 is formed on the second surface of the insulating substrate 41, as illustrated in FIG. 5, when the magnetic part 80 overlaps the corresponding wiring 48, the thickness of the antenna module may be increased. Therefore, in order to prevent the increase in the thickness of the antenna module, the magnetic part 80 may be removed from a region in which the leading wiring 48 is formed.

Figure 6:
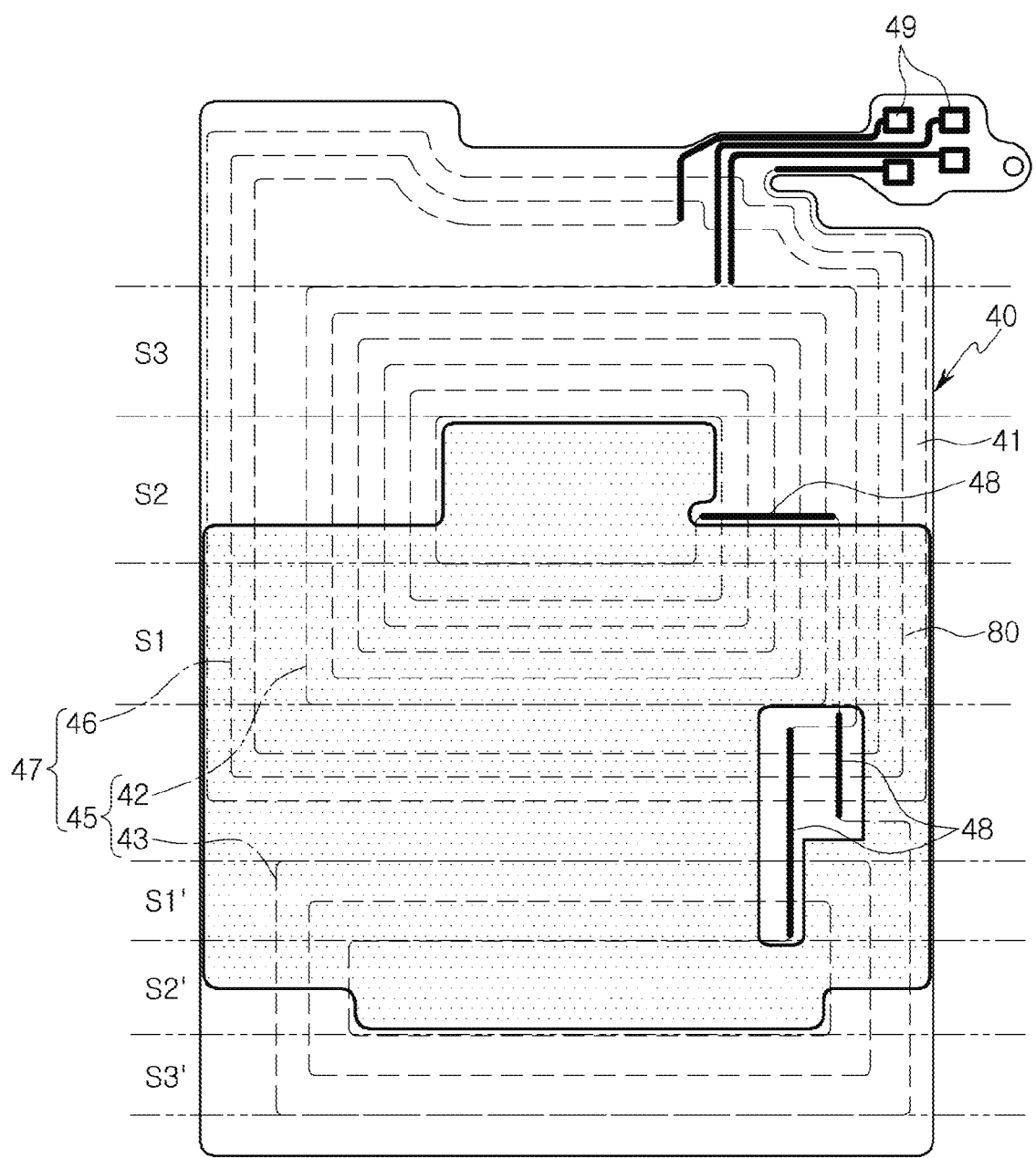
FIG. 6 is a plan view schematically illustrating an antenna module according to an example.

FIG. 6 is a plan view schematically illustrating an antenna module according to an example.

Referring to FIG. 6, an antenna module according to the example may have the magnetic part 80 that faces a portion of the first spiral wiring 42 of the first antenna wiring 45 and a portion of the second spiral wiring 43 of the first antenna wiring 45.

The first spiral wiring 42 and the second spiral wiring 43 may be divided into the first to third regions S1, S2, S3, S1', S2', and S3', respectively, and the magnetic part 80 may also be disposed to face a portion of the first spiral wiring 42 and a portion of the second spiral wiring 43.

The first spiral wiring 42 and the second spiral wiring 43 may be configured so that portions disposed to be adjacent to the upper end portion and the lower end portion of the wiring part 40 are exposed to the outside of the magnetic part 80, and a portion disposed at the center of the wiring part 40, that is, a portion of the first spiral wiring 42 and the second spiral wiring 43 disposed to be adjacent to each other faces the magnetic part 80.

In a case in which the antenna module is configured as described above, since a range of the magnetic field is extended in two directions (the upper end portion side and the lower end portion side of the wiring part), a recognition range may be further extended.

Figure 7:
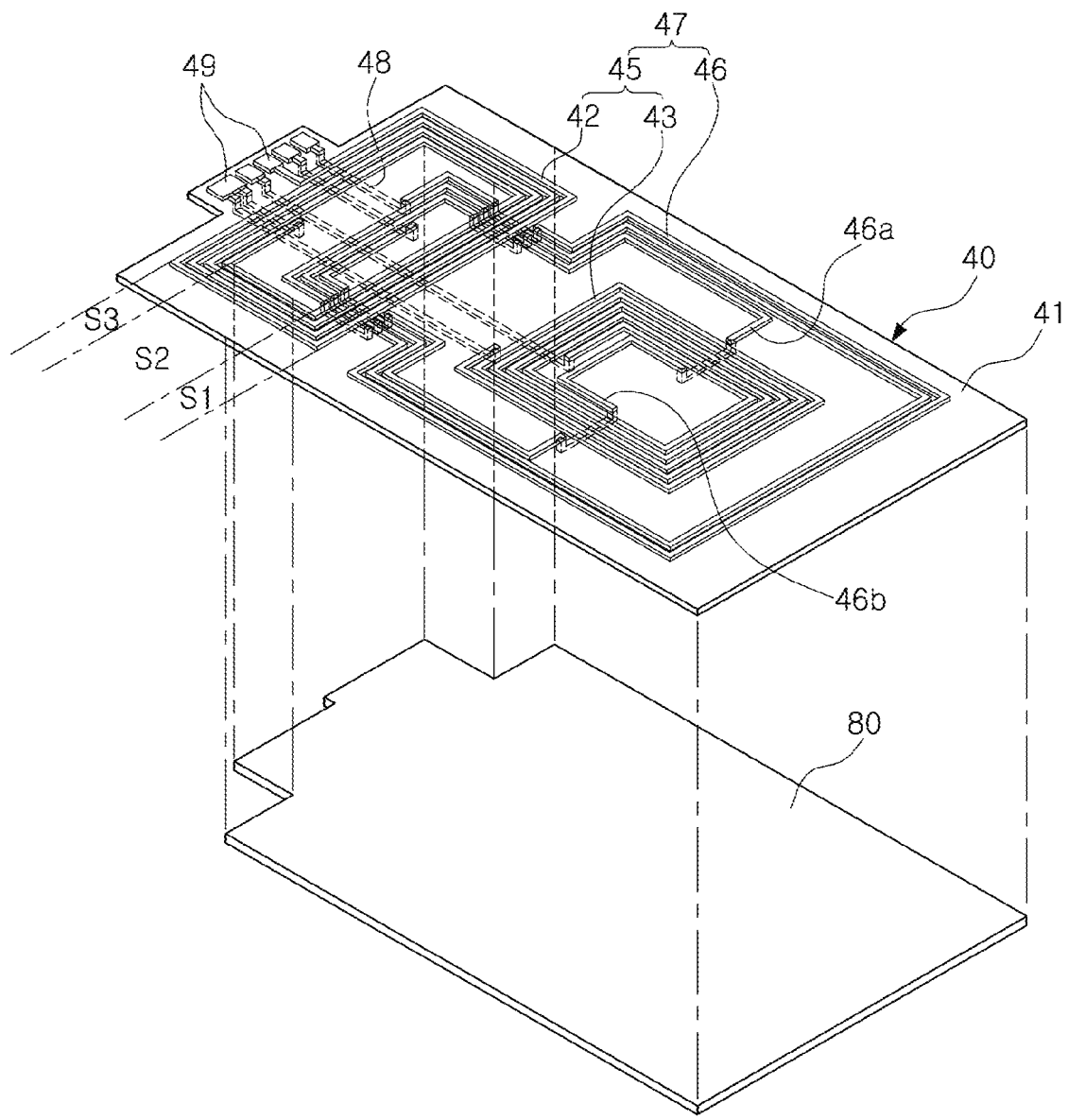
FIG. 7 is an exploded perspective view schematically illustrating an antenna module according to an example.

FIG. 7 is a perspective view schematically illustrating an antenna module according to an example.

Referring to FIG. 7, in an antenna module according to the example, the second spiral wiring 43 of the first antenna wiring 45 may be used as a wireless charging coil for receiving power.

The magnetic secure transmission (MST) and the wireless charging are not simultaneously performed in the electronic device such as the portable terminal and any one function may be selectively performed.

In the antenna module according to the example, when the wireless charging is performed, the second spiral wiring 43 may be independently operated as the wireless charging coil, and when the magnetic secure transmission is performed, the entirety of the first spiral wiring 42 and the second spiral wiring 43 may be operated as a magnetic secure transmission (MST) antenna.

A switching circuit (not shown) may be added to a portion of the antenna module at which the first spiral wiring 42 and the second spiral wiring 43 are connected to each other.

The antenna module according to the example is disposed so that a portion 46*a* (hereinafter, referred to as a divided wiring) of the second antenna wiring 46 used as a near field communication (NFC) antenna crosses an internal region of the second antenna wiring 46. Specifically, the divided wiring 46*a* is disposed on the internal region of the second antenna wiring 46 to approximately bisect the central region of the second antenna wiring 46.

Since the central region of the second antenna wiring 46 becomes the second spiral wiring 43, the divided wiring 46*a* may also be disposed to cross the second spiral wiring 43.

Such a divided wiring 46*a* may be provided to prevent a tag recognition rate from being reduced on the internal region of the second antenna wiring 46. That is, as the divided wiring 46*a* is disposed to cross the internal region of the second antenna wiring 46, since the magnetic field is also generated from the divided wiring 46*a*, the tag recognition rate may be increased in the internal region of the second antenna wiring 46.

The divided wiring 46*a* includes a modified pattern 46*b* formed at a central portion thereof.

In a case in which the central portion of the divided wiring 46*a* is formed in a spiral shape, a size of the magnetic field may be increased in the internal region of the second antenna wiring 46. However, in a case in which the magnetic field interferes with the magnetic field generated from the second antenna wiring 46 disposed at an outside region of the second spiral wiring 43, the magnetic fluxes are offset and the recognition rate may be lowered.

Therefore, the modified pattern 46*b* may not be formed in the spiral shape, but may protrude from the central portion of the divided wiring 46*a* to one side thereof. The modified pattern 46*b* approaches the second antenna wiring 46 disposed on the outside region of the second spiral wiring 43 from the central portion of the second antenna wiring 46. According to the example, since the modified pattern 46*b* is disposed on the internal region of the second spiral wiring 43, a shape of the modified pattern 46*b* may be similar to a shape of the wiring disposed in the innermost portion of the second spiral wiring 43. For example, according to the example, the modified pattern 46*b* may be formed in a shape of '⊏' according to a shape of the internal region of the second spiral wiring 43. However, the disclosure is not limited to such a configuration, but may be variously modified. For example, the modified pattern 46*b* may be formed in a half circular shape or a trapezoidal shape.

The modified pattern 46*b* may be disposed to approach the second antenna wiring 46, which is disposed to be adjacent to the first spiral wiring 42, toward the center of the modified pattern 46*b*.

Such a configuration significantly reduces a mutual offset of a magnetic flux of the second antenna wiring 46 and a magnetic flux of the divided wiring 46*a*, which are disposed at opposite sides due to interference.

Therefore, the modified pattern 46*b* may be disposed to be away from a wiring of the second antenna wiring 46 with which the magnetic flux is offset.

The antenna module may include a portion of the second antenna wiring 46 disposed on the internal region of the first spiral wiring 42. Such a configuration disposes the second antenna wiring 46 to be maximally spaced apart from the second spiral wiring 43.

In a case in which the second antenna wiring 46 is disposed to surround the second spiral wiring 43, some sections of the second antenna wiring 46 may be disposed between the first spiral wiring 42 and the second spiral wiring.

Therefore, when a size of the insulating substrate 41 is small, the sections of the second antenna wiring 46 may be closely disposed to be very adjacent to the first spiral wiring 42 and the second spiral wiring 43.

In this case, the second antenna wiring 46 disposed between the first spiral wiring 42 and the second spiral wiring 43 may interfere with the first spiral wiring 42 and the second spiral wiring 43 during operation, and the recognition rate may be lowered.

Accordingly, in the example, some sections of the second antenna wiring 46 disposed between the first spiral wiring 42 and the second spiral wiring 43 may be disposed on the central region of the first spiral wiring 42.

The second antenna wiring 46 may be disposed on the central region of the first antenna wiring 42 so as to be maximally spaced apart from the first spiral wiring 42 in the internal region of the first spiral wiring 42. At least a portion of the sections of the second antenna wiring 46 may be disposed to be in parallel to the first spiral wiring 42.

In a case in which the antenna module is configured as described above, the recognition rate of the second antenna wiring 46 used as a near field communication (NFC) antenna is improved.

Further, the magnetic part 80 may face the entirety of the second spiral wiring 43 and the second antenna wiring 46, and may face only the entirety of the first region S1 and a portion of the second region S2 (e.g., a portion of the wiring and the entirety of the central region) of the first spiral wiring 42.

The antenna module according to the example may be used for MST communications, NFC communications, and wireless charging. Therefore, six connection terminals 49 may be required. However, since one end of the second spiral wiring 43 and one end of the first spiral wiring 42 are connected to each other, one end of the second spiral wiring 43 and one end of the first spiral wiring 42 may share one connection terminal 49.

Therefore, the antenna module may include only five connection terminals 49. However, the disclosure is not limited to any specific number of connection terminals, and the number of the connection terminals 49 may be varied.

Figure 10:
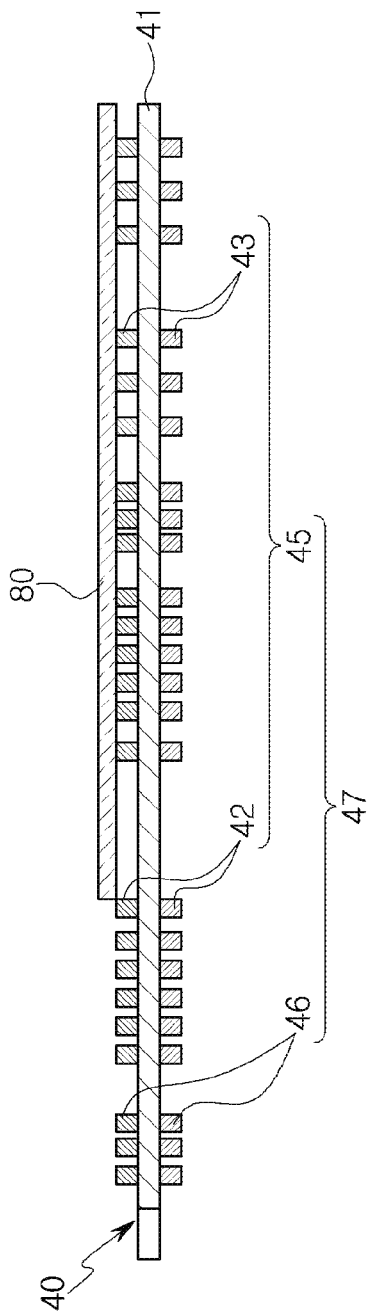
FIG. 10 is a plan view schematically illustrating an antenna module according to an example.

The antenna module according to the example may have the antenna wirings 47 formed on opposite surfaces of the insulating substrate 41, as in the antenna module illustrated in FIG. 10.

Figure 8:
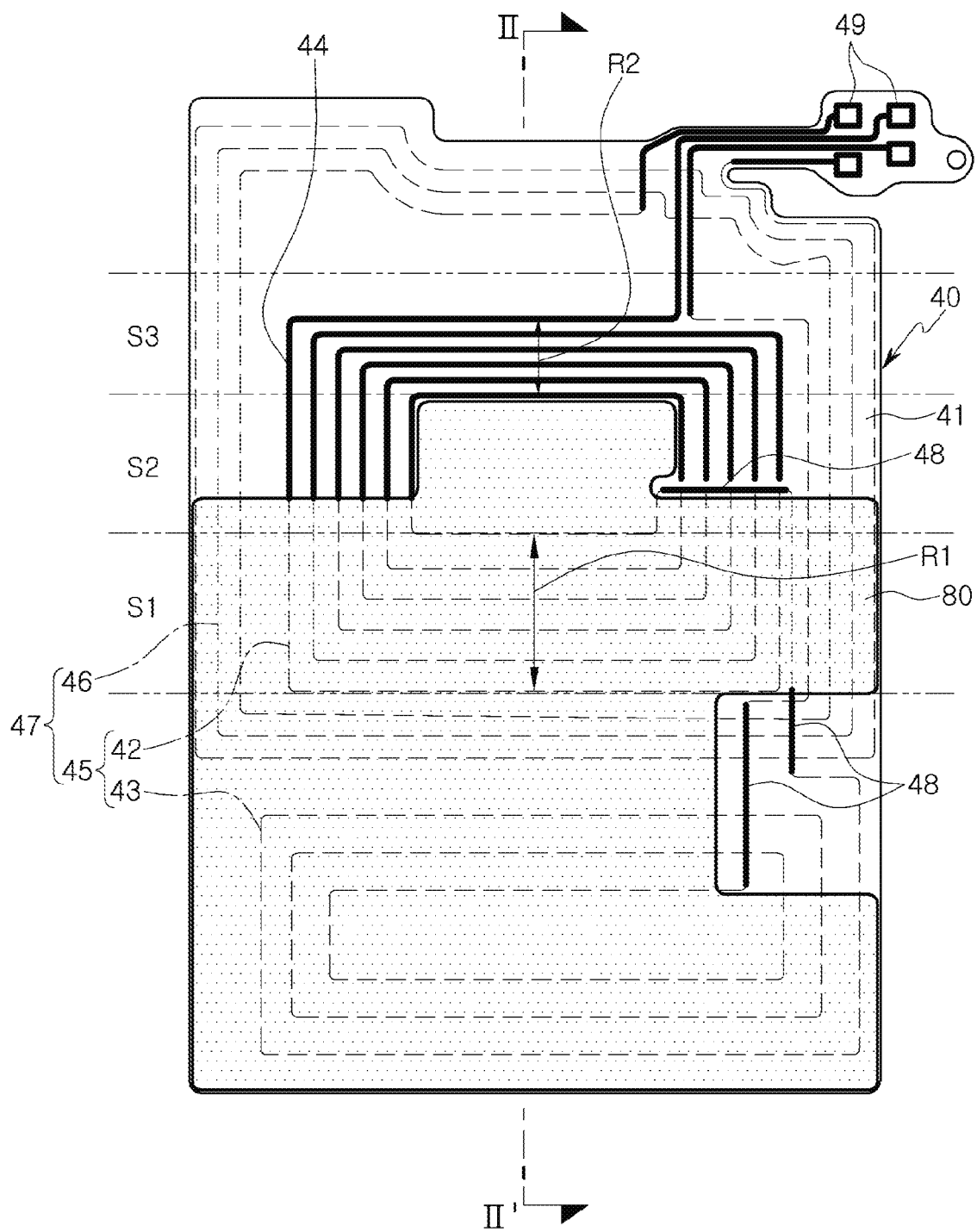
FIG. 8 is a plan view schematically illustrating the antenna module according to an example.
Figure 9:
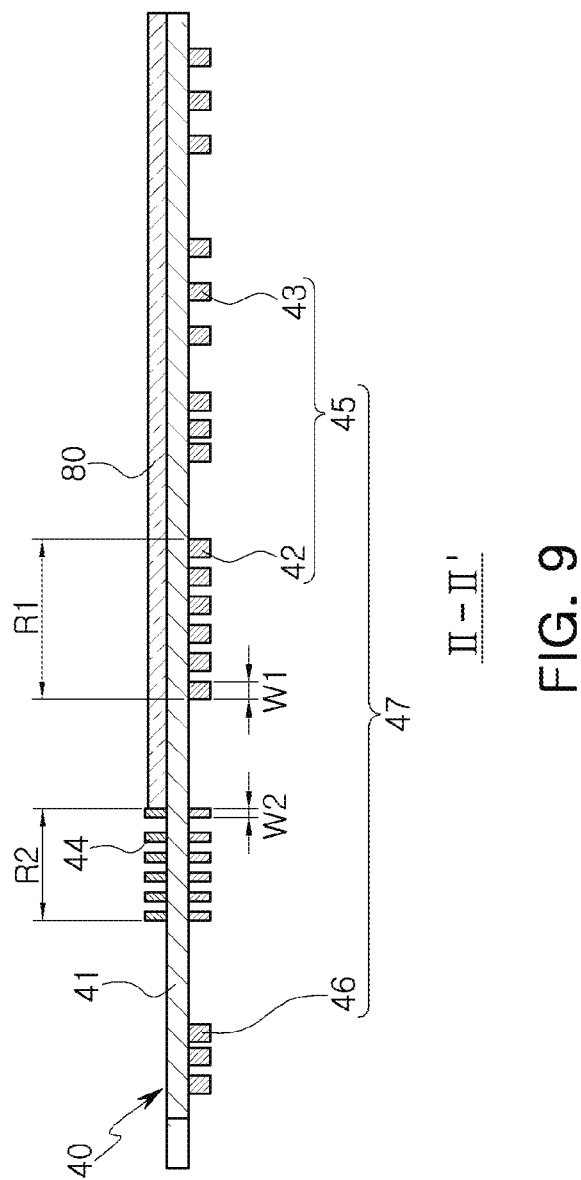
FIG. 9 is a cross-sectional view taken along a line II-II' of FIG. 8.

FIG. 8 is a plan view schematically illustrating an antenna module according to an example and FIG. 9 is a cross-sectional view of FIG. 8.

Referring to FIGS. 8 and 9, an antenna module according to the example may have a configuration similar to that of the antenna module illustrated in FIGS. 1 through 3 and may have a difference in which an auxiliary wiring 44 is disposed on a region on which the magnetic part 80 is not disposed.

The auxiliary wiring 44 may be disposed on a region of the second surface of the insulating substrate 41 that does not face the magnetic part 80. The auxiliary wiring 44 may include a plurality of linear wirings and both ends of each of the linear wirings may be connected to the first spiral wiring 42 through a connection conductor (not shown) penetrating through the insulating substrate 41.

The linear wirings may be disposed to be in parallel to the first spiral wiring 42 so as to overlap the first spiral wiring 42. The first spiral wiring 42 may be formed in a single line in a region in which the first spiral wiring 42 faces the magnetic part 80, and may be connected in parallel by the auxiliary wiring 44 in a section in which the auxiliary wiring 44 is disposed.

Since the portion of the first spiral wiring 42 configured in parallel includes two-strand wirings, resistance does not greatly increase even if a line width of each strand is reduced to about half.

Therefore, the first spiral wiring 42 according to the example may be configured so that a wiring line width W2 of a portion (or a portion having a parallel structure) exposed to the outside of the magnetic part 80, and a wiring line width W1 of a portion facing the magnetic part 80 are different from each other. The line width W2 of the wiring exposed to the outside of the magnetic part 80 may be narrower than the line width W1 of the wiring facing the magnetic part 80.

Since the line width W2 of the portion of the first spiral wiring 42 having the parallel structure is relatively narrow, an entire line width R2 may also be narrower than an entire line width R1 of the portion facing the magnetic part 80.

Here, the entire line widths R1 and R2 is the shortest distance between the innermost turn and the outermost turn of the first spiral wiring 42.

FIG. 10 is a plan view schematically illustrating an antenna module according to an example.

Referring to FIG. 10, in the antenna module according to the example, all the spiral wirings of the first antenna wiring 45 and the second antenna wiring 46 may be disposed on the opposite surfaces of the insulating substrate 41. Therefore, the thickness of the antenna module may be increased as compared to the above-mentioned examples, but since the antenna wiring 47 may be partially configured in a parallel structure, the line width of the antenna wiring 47 may be reduced in the portion of the parallel structure. As a result, an entire size of the antenna module may be reduced.

In this case, in a portion in which the leading wiring 48 (FIG. 8) is disposed, the spiral wiring may be only disposed on one surface of the insulating substrate, not on the opposite surfaces thereof. Therefore, the spiral wiring disposed on the same surface as the leading wiring may include a plurality of linear patterns similar to the auxiliary wiring 44 of FIG. 8, and both ends of each of the linear patterns may be electrically connected to the spiral wiring disposed on the opposite surface through the connection conductor.

Therefore, in the section in which the leading wiring 48 (FIG. 8) is disposed, the spiral wiring may be configured in the parallel structure, and in the portion in which the wirings do not overlap, the spiral wiring may be configured in the parallel structure.

As the antenna wiring 47 is disposed on the opposite surfaces of the insulating substrate 41, the antenna wiring 47 may also be disposed between the magnetic part 80 and the insulating substrate 41. Therefore, in the example, the magnetic part 80 may be disposed to be spaced apart from the insulating substrate 41 by the antenna wiring 47.

The antenna wirings 47 disposed on the opposite surfaces of the insulating substrate 41 may be connected in parallel to or in series with each other. Although the examples describes the case in which both the first antenna wiring 45 and the second antenna wiring 46 are disposed on the opposite surfaces of the insulating substrate 41, the disclosure is not limited to such a configuration, but may be variously modified. For example, only one of the first antenna wiring 45 and the second antenna wiring 46 may be disposed on the opposite surfaces of the insulating substrate 41.

FIGS. 11 through 15 are plan views schematically illustrating an antenna module according to examples. The antenna module according to an example may have the configuration similar to that of the antenna module illustrated in FIG. 1 and have a difference in a structure of the magnetic part 80. However, the disclosure is not limited to such a configuration, and the wiring part 40 described in other examples may be applied.

Figure 11:
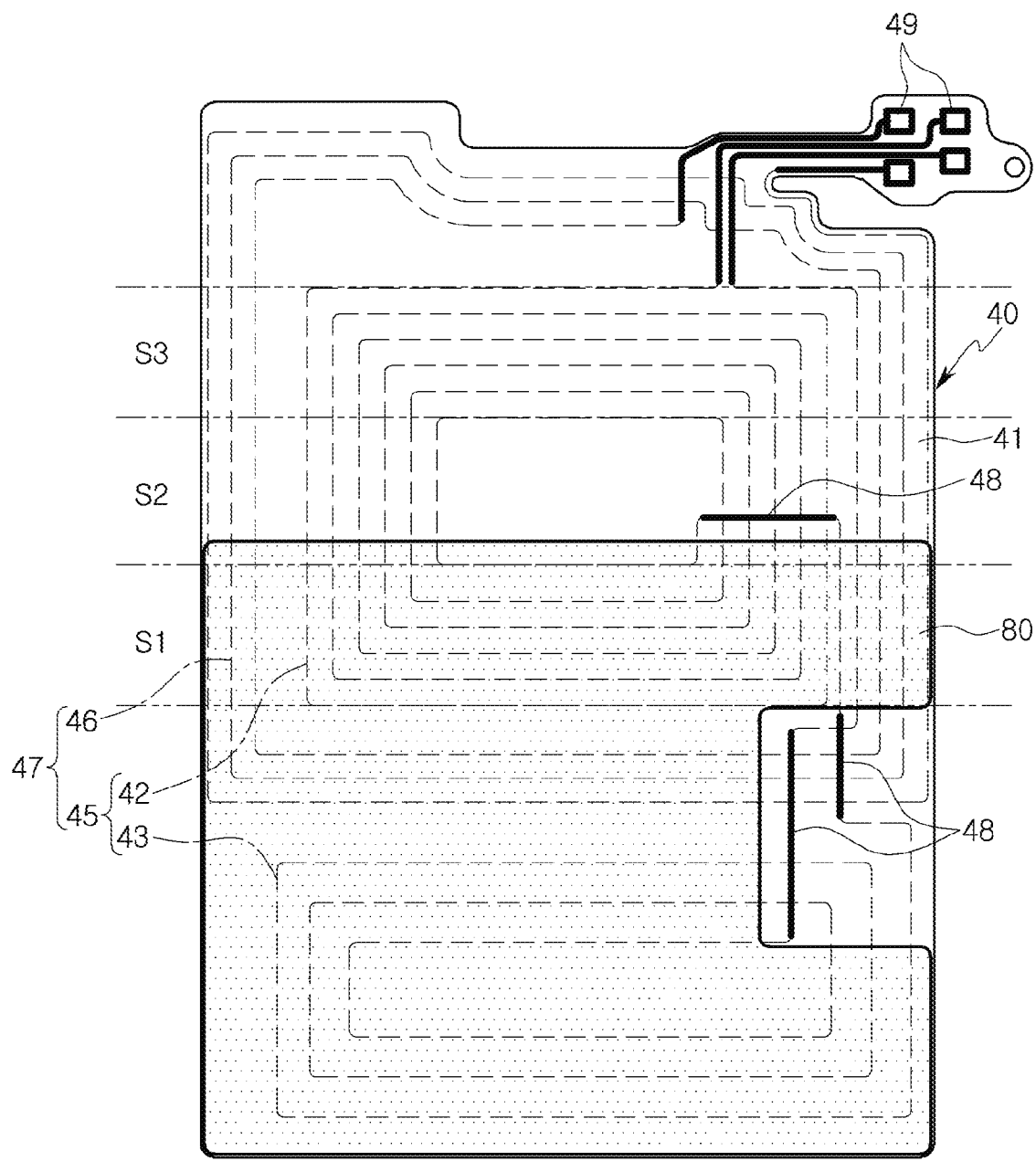
FIGS. 11 through 15 are plan views schematically illustrating an antenna module according to an example.

Referring to FIG. 11, in the antenna module according to the example, the magnetic part 80 may be disposed to face the entirety of the first region S1 of the first spiral wiring 42, and only a portion of the second region S2 of the first spiral wiring 42. The remaining portion of the second region S2 and the entirety of the third region S3 of the first antenna wiring 45 may be all exposed to the outside of the magnetic part 80.

Figure 12:
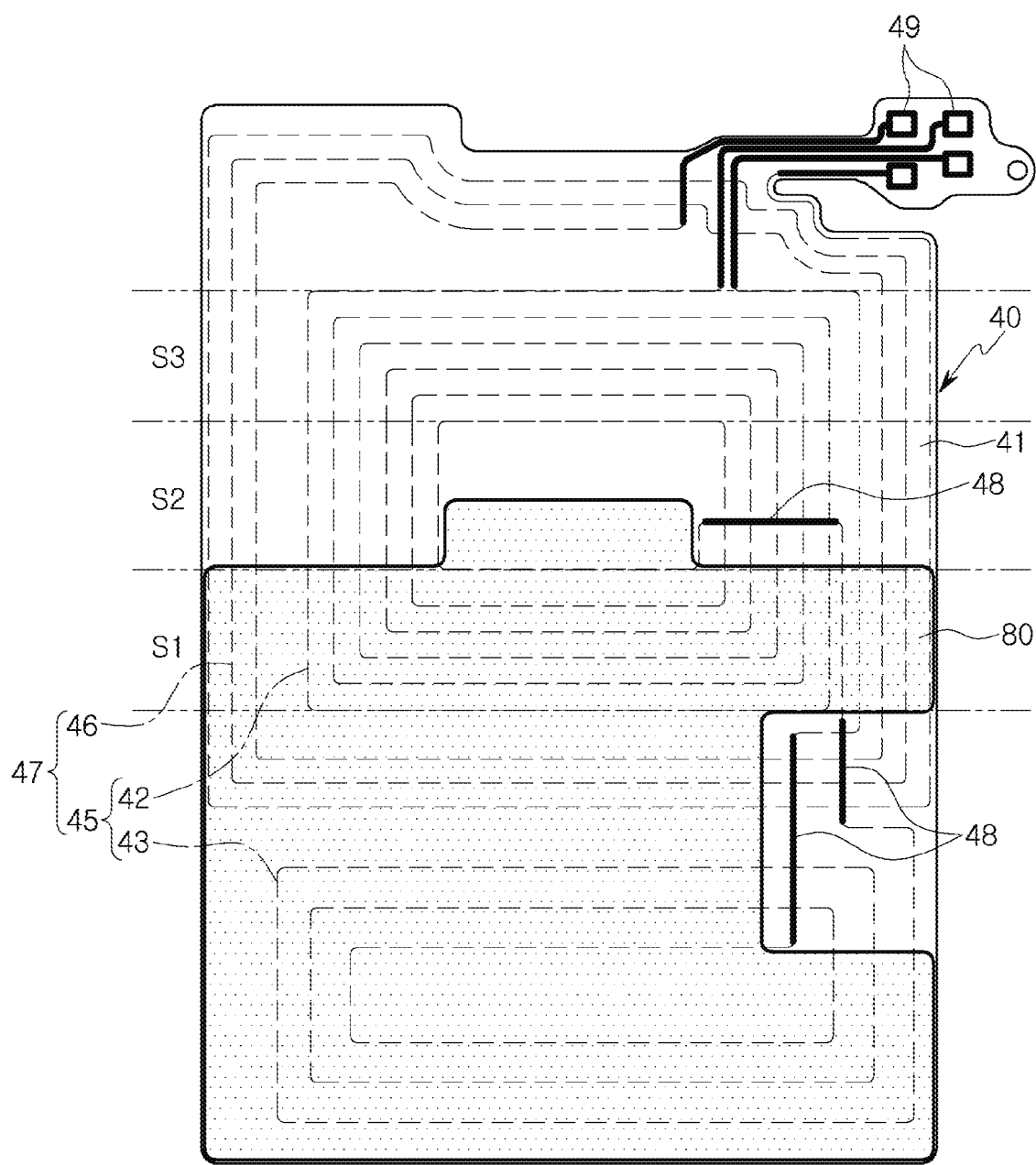

Referring to FIG. 12, in the antenna module according to the example, the magnetic part 80 may be disposed to face the entirety of the first region S1 of the first spiral wiring 42 and only the central region of the second region S2 of the first spiral wiring 42. The entirety of the antenna wiring disposed on the second region S2 and the third region S3 may be all exposed to the outside of the magnetic part 80.

Figure 13:
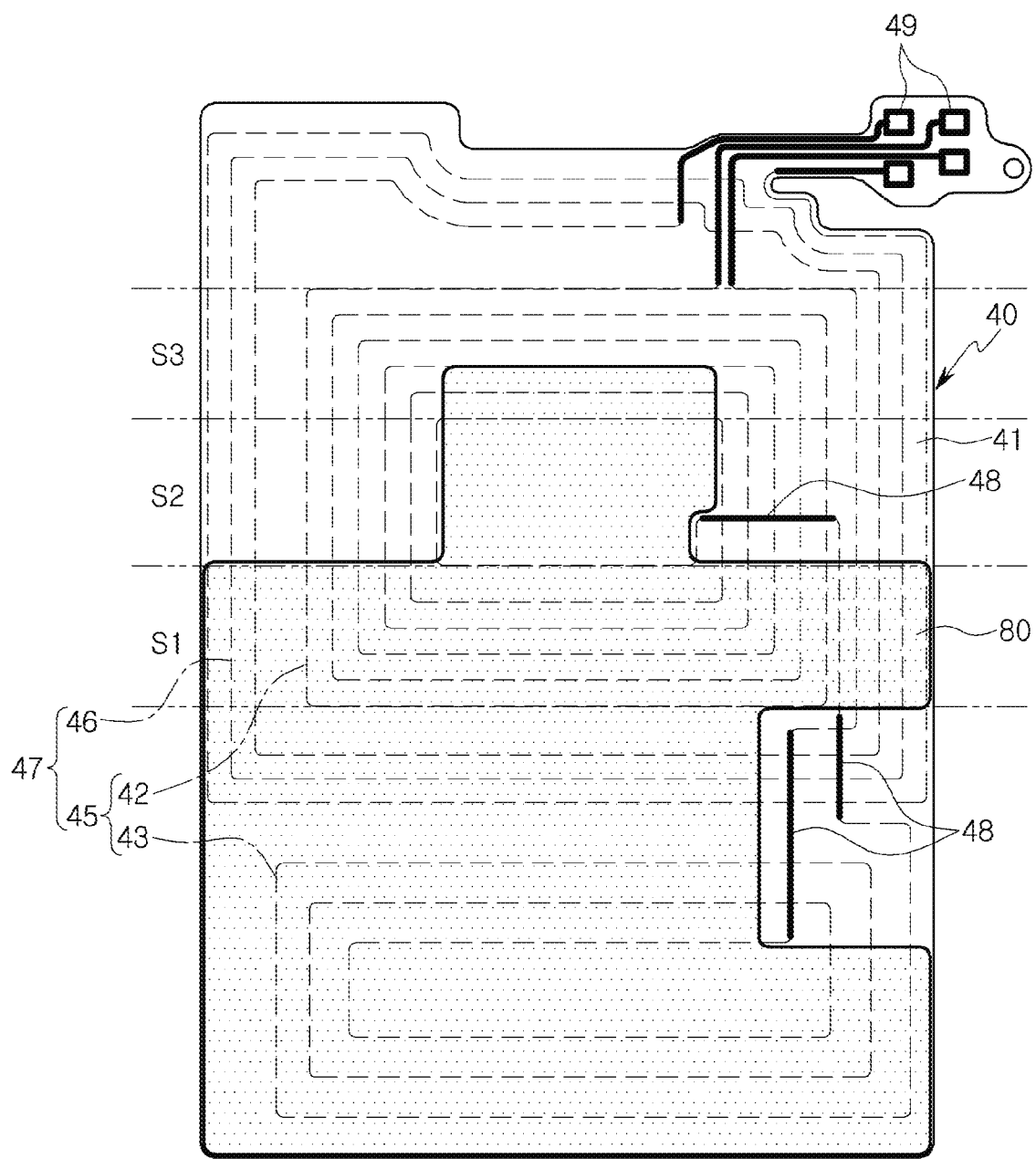

Referring to FIG. 13, in the antenna module according to the example, the magnetic part 80 may be disposed to face the entirety of the first region S1 of the first spiral wiring 42, the entirety of the central region of the second region S2 of the first spiral wiring 42, and a portion of the third region S3 of the first spiral wiring 42.

In the example, the magnetic part 80 may be disposed to face only the central region in the second region S2. A portion of the magnetic part 80 facing the central region may be disposed to be extended to the third region S3 with the same width and to face a portion of the antenna wiring disposed on the third region S3.

Figure 14:
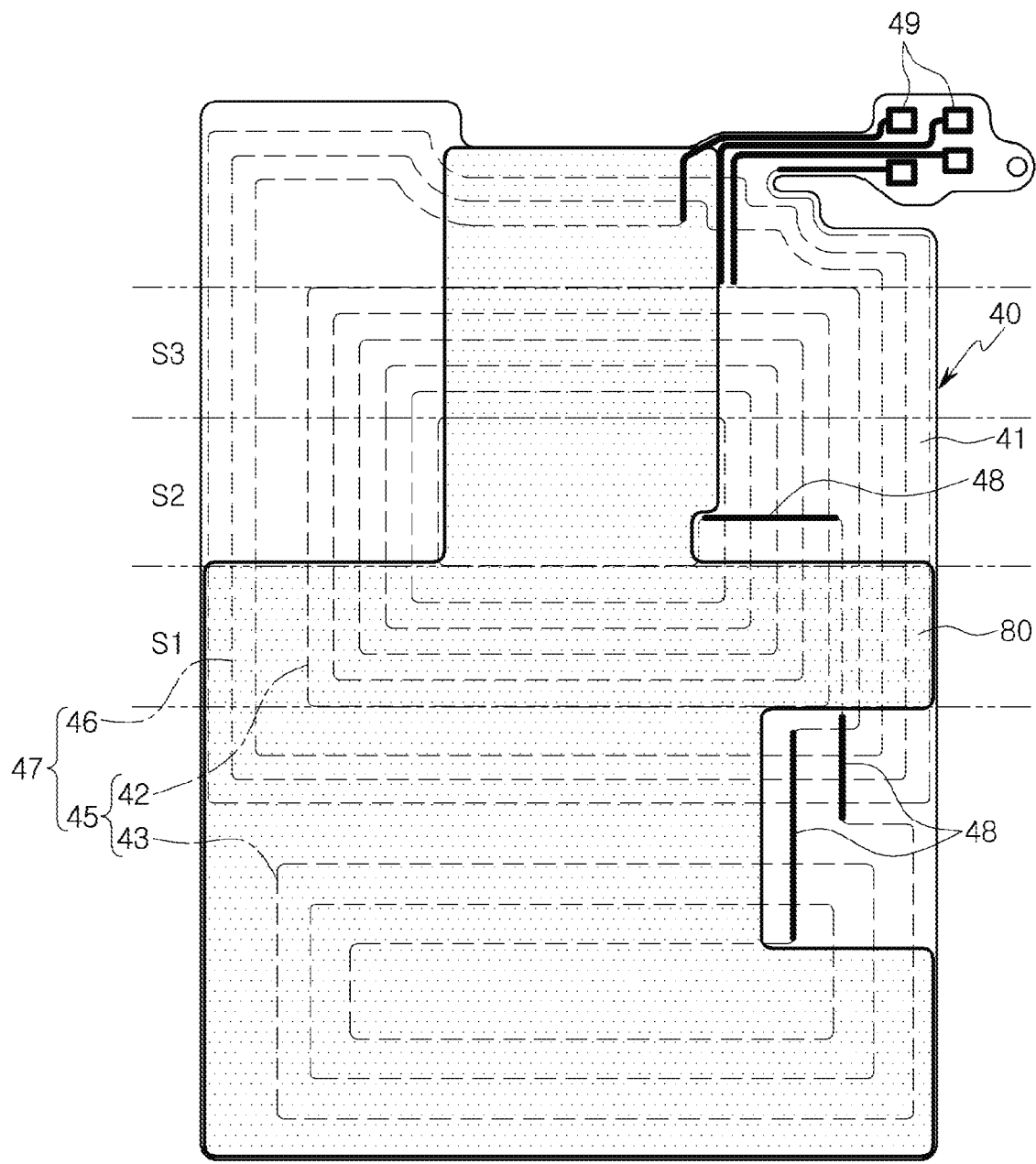

Referring to FIG. 14, in the antenna module according to the example, the magnetic part 80 may be disposed to face the entirety of the first region S1 of the first spiral wiring 42, the entirety of the central region of the second region S2 of the first spiral wiring 42, and a portion of the third region S3 of the first spiral wiring 42.

In the example, the magnetic part 80 may be disposed to face only the central region in the second region S2. A portion of the magnetic part 80 facing the central region may be extended up to the end of the wiring part 40 to cover a portion the antenna wiring disposed on the third region S3 and a portion of the second antenna wiring 46.

The magnetic part 80 disposed on the third region S3 may have the same width as that of the central region, and may be disposed to cross the firs spiral wiring 42 in a radial direction.

Figure 15:
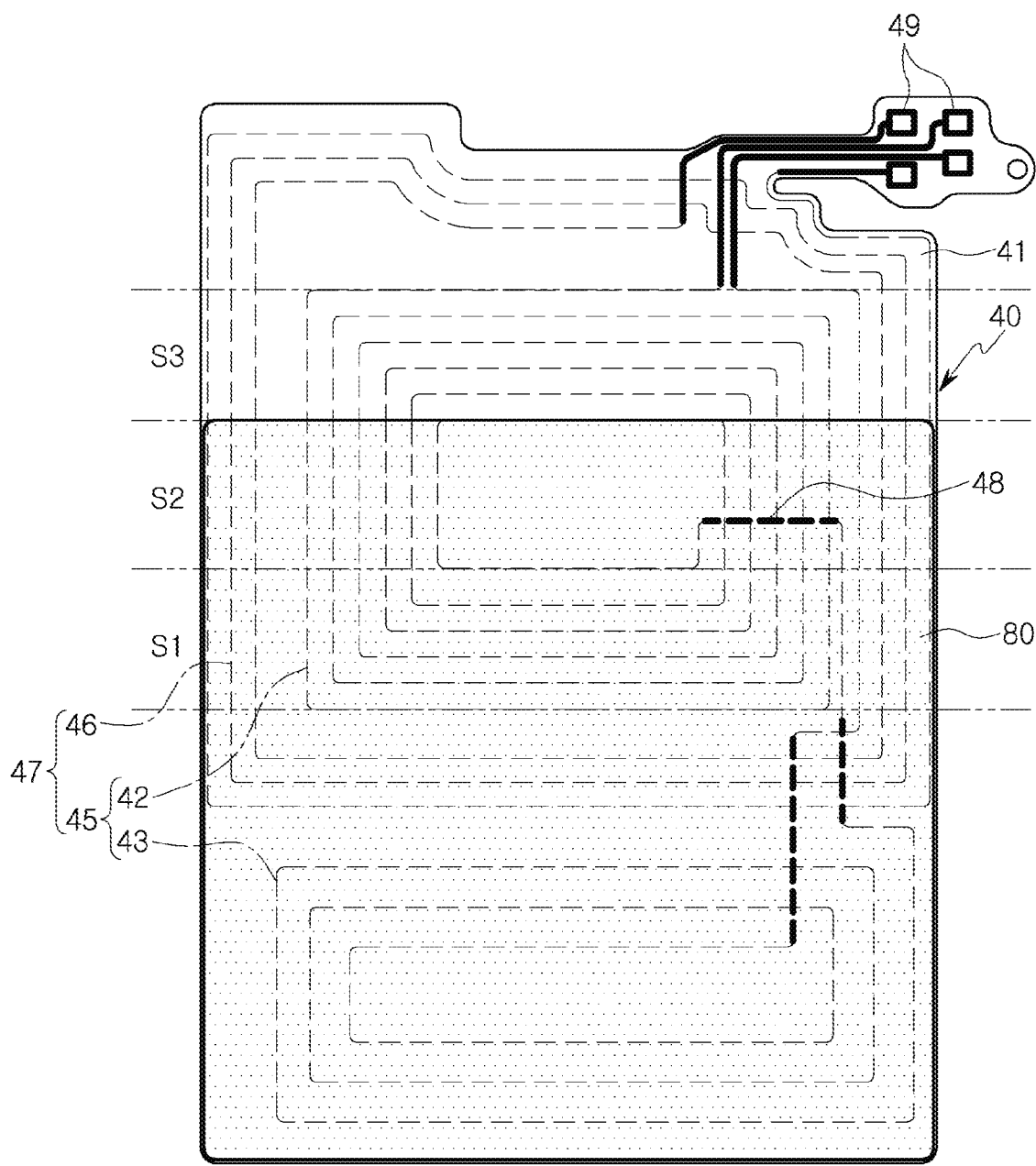

Referring to FIG. 15, in the antenna module according to the example, the magnetic part 80 may be disposed to face the entirety of the first region S1 of the first spiral wiring 42 and the entirety of the second region S2 of the first spiral wiring 42, and the entirety of the third region S3 may be exposed to the outside of the magnetic part 80.

At least a portion of the third region S3 of the spiral wiring does not face the magnetic part 80 and may be exposed to the outside of the magnetic part 80. Accordingly, the range of the magnetic field may be extended, thereby increasing the recognition rate.

Figure 17:
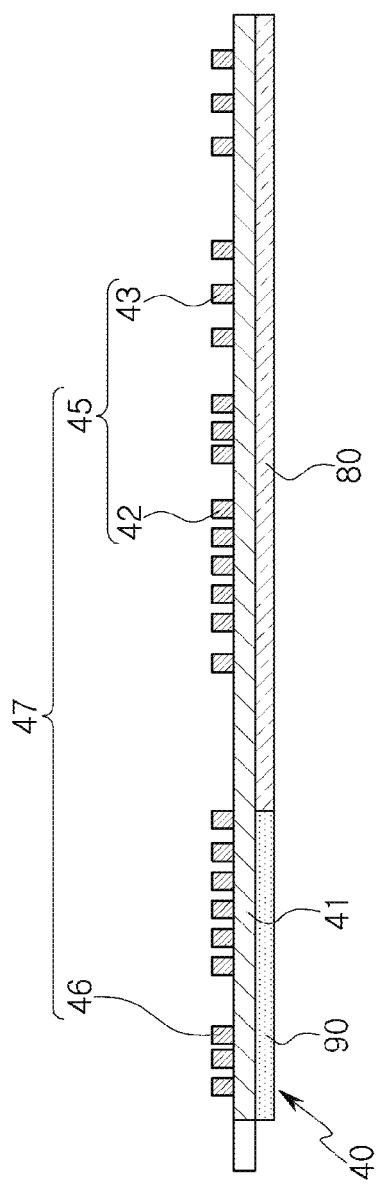
FIGS. 17 through 19 are cross-sectional views schematically illustrating an antenna module according to an example.
Figure 18:
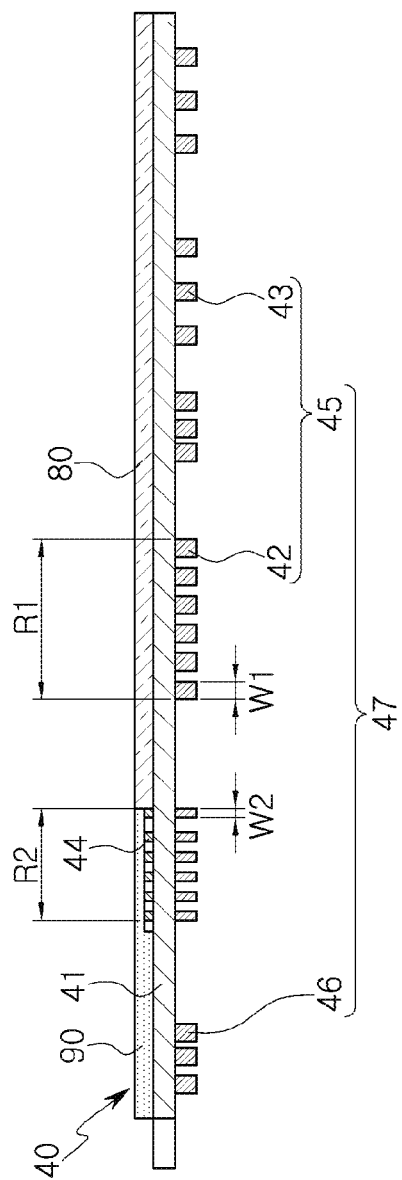
Figure 19:
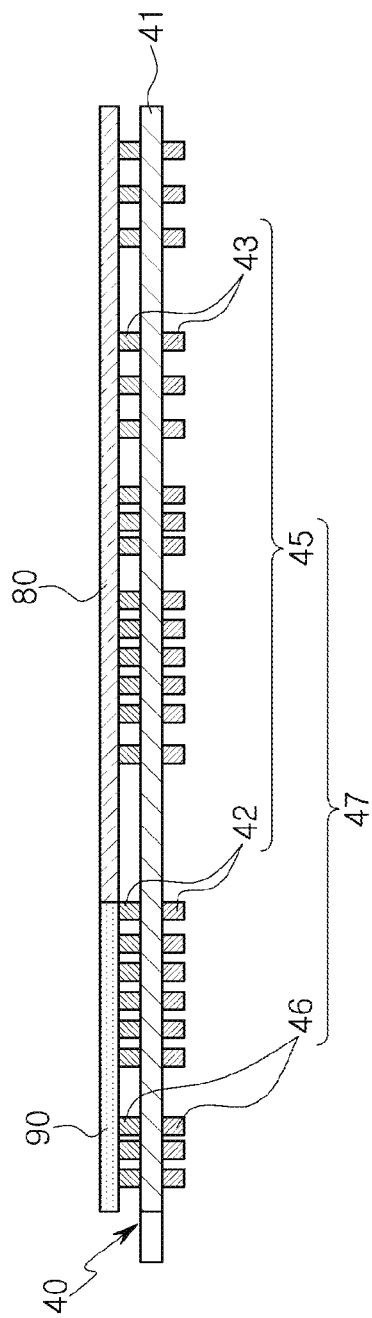

FIGS. 17 through 19 are cross-sectional views schematically illustrating an antenna module according to modified examples of the examples illustrated in FIGS. 3, 9, and 10.

Referring to FIG. 17, an auxiliary member 90 may be disposed on a region (e.g., a portion of the S2 region and the S3 region of FIG. 2) of the second surface of the insulating substrate 41 on which the magnetic part 80 is not disposed.

The auxiliary member 90 may be disposed on the region of the second surface of the insulating substrate 41 on which the magnetic part 80 is not disposed.

The entire thickness of the auxiliary member 90 may be similar to the thickness of the magnetic part 80, and may be equal to or smaller than the thickness of the magnetic part 80. Even though the antenna module 100 according to the example in FIG. 17 includes the auxiliary member 90, the entire thickness of the antenna module may not be increased.

The auxiliary member 90 may be a heat radiating sheet that radiates heat generated from the wiring part 40 to the outside. In this case, a temperature of the antenna module may be reduced.

In the case in which the auxiliary member 90 is the heat radiating sheet, the auxiliary member 90 may be formed of a non-metallic material having high thermal conductivity such as graphite.

The auxiliary member 90 may be an elastic sheet. In this case, as the auxiliary member 90 is disposed so that the magnetic part 80 faces only some regions of the wiring part 40, the magnetic part 80 may significantly reduce a step generated between the wiring parts 40. As a result, assembling workability may be improved.

When the auxiliary member 90 is provided, damage on the wiring part may be prevented, such as scratching, stabbing, or the like on the wiring part during a manufacturing process. As a result, completeness of a product may be increased.

The elastic sheet may be formed in the form of a foam, a sponge, or the like, and may be formed of a non-metallic material having elasticity such as a urethane foam or a PET film. However, the elastic sheet is not limited to such a configuration.

Referring to FIG. 18, the thickness of the auxiliary wiring 44 may be thinner than that of the magnetic part 80. The thickness of the auxiliary member 90 may be equal to or similar to a difference between the thickness of the magnetic part 80 and the thickness of the auxiliary wiring 47.

The entire thickness of the auxiliary wiring 44 and the auxiliary member 90 stacked on the auxiliary wiring 44 may be equal to or similar to the thickness of the magnetic part 80.

Therefore, even though the antenna module 100 according to the example includes the auxiliary member 90, the entire thickness of the antenna module may not be increased.

Meanwhile, in the example, only a portion of the auxiliary member 90 facing the auxiliary wiring 44 may be thin, and the thickness of a portion of the auxiliary member 90 that does not face the auxiliary wiring 44 may be similar to the thickness of the magnetic part 80. In this case, the magnetic part 80 may significantly reduce the step generated between the wiring parts 40.

However, the disclosure is not limited to such a configuration, but may be variously modified. For example, the entirety of the auxiliary member 90 may have the same thickness, or the auxiliary member 90 may be disposed only on a region facing the auxiliary wiring 44.

Although the example in FIG. 18 describes the case in which the auxiliary wiring 44 is thinner than the antenna wiring 47, the disclosure is not limited to such a configuration, but may be variously modified. For example, the auxiliary wiring 44 and the antenna wiring 47 may have the same thickness or the antenna wiring 47 may be thinner than the auxiliary wring 44.

Referring to FIG. 19, the spiral wirings of the first antenna wiring 45 and the second antenna wiring 46 may be all disposed on the opposite surfaces of the insulating substrate 41. Therefore, the magnetic part 80 and the auxiliary member 90 may be all disposed to be stacked on the antenna wiring 47.

The magnetic part 80 and the auxiliary wiring 47 may be formed to have the same thickness and disposed on the second surface of the insulating substrate 41.

In the example, the antenna wirings disposed on the opposite surfaces of the insulating substrate 41 have the same thickness, but are not limited to such a configuration. The antenna wiring disposed on the second surface of the insulating substrate 41 may be relatively thin and the magnetic part 80 and the auxiliary wiring 47 may also be disposed by the thickness difference.

When the auxiliary member 90 is disposed on the region of the second surface of the insulating substrate 41 on which the magnetic part 80 is not disposed, the auxiliary member 90 may be modified in various forms.

According to the examples disclosed herein, an antenna module may provide a high recognition rate and may significantly reduce a size of a magnetic part, thereby saving a manufacturing cost.

Additionally, an antenna module may be included in an electronic device such as a portable terminal and used in short-range communications. An antenna module is capable of increasing a recognition rate.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:
   an insulating substrate;
   a first antenna wiring comprising,
      a first spiral wiring on the insulating substrate and comprising a first portion adjacent to an edge of the insulating substrate, and
      a second spiral wiring on the insulating substrate and spaced apart from the first spiral wiring;
   a magnetic part on one surface of the insulating substrate and overlapping a second portion of the first spiral wiring that is adjacent to the second spiral wiring without overlapping the first portion of the first spiral wiring;
   a second antenna wiring on the insulating substrate to surround the second spiral wiring; and
   an auxiliary wiring electrically connected to the first spiral wiring and disposed on the one surface of the insulating substrate to not overlap the magnetic part,
   wherein at least a portion of the second antenna wiring is in a central region of the first spiral wiring, and
   the auxiliary wiring comprises linear wirings, and both ends of each of the linear wirings are connected to the first spiral wiring through connection conductors penetrating through the insulating substrate.

2. The antenna module of claim 1, wherein
   the first spiral wiring comprises a first region between the central region of the first spiral wiring and the second spiral wiring, a second region on an opposite side of the central region of the first spiral wiring from the first region, and a third region between the first region and the second region, and
   the magnetic part overlaps an entirety of the first region of the first spiral wiring.

3. The antenna module of claim 2, wherein
   the second spiral wiring comprises a first region between a central region of the second spiral wiring and the first spiral wiring, a second region on an opposite side of the central region of the second spiral wiring from the first region of the second spiral wiring, and a third region disposed between the first region of the second spiral wiring and the second region of the second spiral wiring, and
   the magnetic part overlaps an entirety of the first region of the second spiral wiring.

4. The antenna module of claim 2, wherein the magnetic part overlaps at least a portion of the central region of the first spiral wiring.

5. The antenna module of claim 4, wherein the magnetic part overlaps at least a portion of the second region of the first spiral wiring.

6. The antenna module of claim 2, wherein the magnetic part overlaps at least a portion of the third region of the first spiral wiring.

7. The antenna module of claim 2, wherein the magnetic part overlaps at least a portion of the second spiral wiring.

8. The antenna module of claim 2, wherein the first spiral wiring and the second spiral wiring are connected to each other in series and are in opposing spiral directions.

9. The antenna module of claim 1, wherein the second antenna wiring comprises a divided wiring, the divided wiring on an innermost side of the second antenna wiring and crossing a central region of the second antenna wiring.

10. The antenna module of claim 9, wherein the divided wiring comprises a modified pattern protruding from a central portion of the divided wiring to one side of the divided wiring.

11. The antenna module of claim 1, wherein a line width of the first portion of the first spiral wiring connected to the auxiliary wiring in parallel is narrower than a line width of the second portion of the first spiral wiring.

12. The antenna module of claim 1, wherein an entire line width of the first portion of the first spiral wiring is narrower than an entire line width of the second portion of the first spiral wiring.

13. The antenna module of claim 1, wherein one or both of the first spiral wiring and the second spiral wiring is on both of opposite surfaces of the insulating substrate and has a partial parallel structure.

14. The antenna module of claim 1, wherein
    the first antenna wiring comprises a leading wiring that leads wiring on an inner side of the first spiral wiring or the second spiral wiring to an outer side of the first spiral wiring or the second spiral wiring, and
    the leading wiring does not overlap the magnetic part and is exposed to an outside of the magnetic part.

15. The antenna module of claim 1, further comprising:
    an auxiliary member on the one surface of the insulating substrate, the auxiliary member not overlapping the magnetic part.

16. The antenna module of claim 15, wherein the auxiliary member has a thickness that is same as or similar to a thickness of the magnetic part.

17. The antenna module of claim 16, wherein the auxiliary member comprises a non-metallic material having high thermal conductivity.

18. The antenna module of claim 16, wherein the auxiliary member comprises a non-metallic material having elasticity.

19. The antenna module of claim 16, wherein one surface of the auxiliary member is bonded to the one surface of the insulating substrate.

20. The antenna module of claim 16, wherein the auxiliary wiring is thinner than the first antenna wiring, and the auxiliary member overlaps the auxiliary wiring.

21. The antenna module of claim 16, wherein the first antenna wiring is on both of opposite surfaces of the insulating substrate, and the auxiliary member is stacked on the first antenna wiring.

22. An electronic device comprising:
- the antenna module of claim 1;
- a case configured to accommodate the antenna module; and
- a circuit module accommodated in the case and on one side of the antenna module,
- wherein the antenna module is in the case so that the first portion of the first spiral wiring is adjacent to the circuit module or partially overlaps the circuit module.

* * * * *